US008334912B2

United States Patent
Toyoda et al.

(10) Patent No.: US 8,334,912 B2
(45) Date of Patent: Dec. 18, 2012

(54) IMAGE PROCESSING APPARATUS, IMAGING APPARATUS, IMAGE PROCESSING METHOD, AND COMPUTER READABLE RECORDING MEDIUM STORING IMAGE PROCESSING PROGRAM

(75) Inventors: Tetsuya Toyoda, Hachioji (JP); Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 439 days.

(21) Appl. No.: 12/552,984

(22) Filed: Sep. 2, 2009

(65) Prior Publication Data
US 2010/0053378 A1 Mar. 4, 2010

(30) Foreign Application Priority Data

| Sep. 3, 2008 | (JP) | 2008-226060 |
| Sep. 3, 2008 | (JP) | 2008-226074 |
| Apr. 10, 2009 | (JP) | 2009-095626 |

(51) Int. Cl.
*H04N 5/262* (2006.01)
*H04N 5/202* (2006.01)

(52) U.S. Cl. ........ 348/239; 348/254
(58) Field of Classification Search ........ 348/222.1, 348/229.1, 230.1, 241, 239, 254
See application file for complete search history.

(56) References Cited

U.S. PATENT DOCUMENTS

| 5,335,013 A * | 8/1994 | Faber .......... 348/104 |
| 5,641,596 A | 6/1997 | Gray et al. |
| 5,831,673 A * | 11/1998 | Przyborski et al. ..... 348/239 |
| 7,667,337 B2 * | 2/2010 | Mahler et al. ........ 257/783 |
| 2006/0262202 A1 * | 11/2006 | Takei .................. 348/239 |

FOREIGN PATENT DOCUMENTS

| CN | 1671201 | 9/2005 |
| CN | 101072333 | 11/2007 |
| JP | 03-214973 | 9/1991 |
| JP | 11-085955 | 3/1999 |
| JP | 2001-128068 | 5/2001 |
| JP | 2002-094884 | 3/2002 |
| JP | 2004-134941 | 4/2004 |
| JP | 2004-260858 | 9/2004 |
| JP | 2006-324808 | 11/2006 |
| JP | 2007-019617 | 1/2007 |
| JP | 2008-092052 | 4/2008 |

OTHER PUBLICATIONS

Office Action for Chinese Patent Application No. 200910171069.X, mailed May 11, 2011 (4 pgs.) with translation (3 pgs.).
Notice of Reasons for Rejection for Japanese Patent Application No. 2008-226074, mailed Jun. 26, 2012 (3 pgs.) with translation (5 pgs.).
Notification of Reasons for Refusal for Japanese Patent Application No. 2008-226060, mailed Aug. 7, 2012 (3 pgs.) with translation (4 pgs.).

* cited by examiner

*Primary Examiner* — Timothy J Henn
(74) *Attorney, Agent, or Firm* — John C. Pokotylo; Straub & Pokotylo

(57) ABSTRACT

A synchronization processing in which an image data having a plurality of color components per pixel is generated based on the image data obtained by an imaging apparatus which includes an image sensor arranged with a plurality of color filters is performed. Then, a predetermined granular pattern is added to the image data subjected to the synchronization processing.

18 Claims, 16 Drawing Sheets

| ISO SENSITIVITY | GAIN SETTING (dB) | | | | | IMAGING NOISE (dB) | IMAGE NOISE (dB) |
|---|---|---|---|---|---|---|---|
| | NR1 | GRN_Y | GRN_C | NR2_Y | NR2_C | | |
| 100 | 0 | – | – | 0 | 0 | 0 | 0 |
| 200 | 2 | – | – | 0 | 0 | –3 | –1 |
| 400 | 2 | – | – | 2 | 2 | –6 | –2 |
| 800 | 4 | – | – | 2 | 2 | –9 | –3 |
| 1600 | 4 | – | – | 4 | 4 | –12 | –4 |
| 3200 | 4 | – | – | 4 | 4 | –15 | –7 |

FIG. 4

| ISO SENSITIVITY | GAIN SETTING (dB) | | | | | IMAGING NOISE (dB) | IMAGE NOISE (dB) |
|---|---|---|---|---|---|---|---|
| | NR1 | GRN_Y | GRN_C | NR2_Y | NR2_C | | |
| 100 | 0 | 12 | 6 | 0 | 0 | 0 | –12 |
| 200 | 2 | 11 | 5 | 0 | 0 | –3 | –12 |
| 400 | 2 | 8 | 4 | 0 | 0 | –6 | –12 |
| 800 | 4 | 7 | 3 | 0 | 0 | –9 | –12 |
| 1600 | 4 | 4 | 2 | 0 | 0 | –12 | –12 |
| 3200 | 4 | 3 | 2 | 2 | 2 | –15 | –12 |

FIG. 5

| ISO SENSITIVITY | GAIN SETTING (dB) | | | | | IMAGING NOISE (dB) | IMAGE NOISE (dB) |
|---|---|---|---|---|---|---|---|
| | NR1 | GRN_Y | GRN_C | NR2_Y | NR2_C | | |
| 100 | – | 12 | 6 | 0 | 0 | 0 | –12 |
| 200 | – | 11 | 5 | 0 | 0 | –1 | –12 |
| 400 | – | 10 | 4 | 0 | 0 | –2 | –12 |
| 800 | – | 9 | 3 | 0 | 0 | –3 | –12 |
| 1600 | – | 8 | 2 | 0 | 0 | –4 | –12 |
| 3200 | – | 7 | 2 | 2 | 2 | –7 | –12 |

FIG. 6

IMAGE PROCESSING APPARATUS, IMAGING APPARATUS, IMAGE PROCESSING METHOD, AND COMPUTER READABLE RECORDING MEDIUM STORING IMAGE PROCESSING PROGRAM

FIELD OF THE INVENTION

The present invention relates to a technology for adding granular patterns as obtained by silver halide photography to an image data taken by a digital camera and so on.

BACKGROUND OF THE INVENTION

Noise components mainly caused by image sensors are superposed on digital images obtained with a digital camera and so on. This noise component is one of the reasons for deteriorating image quality. Generally, efforts are being made to improve the image quality by reducing the noise components superposed on the image using various methods.

Granular noise caused mainly by silver halide particles arises also in silver halide photographs and is one reason for the deterioration of image quality as in digital images. However, the granular feeling caused by the granular noise in fact has some value as an expression of silver halide photographs.

Under such a situation, in order to give the same value of the silver halide photograph to digital images and to enable the adding of the visual effects of silver halide particles, various types of technologies for superposing the granular pattern imitated to the granular feeling of the silver halide particles onto digital images are being proposed. For example, in U.S. Pat. No. 5,641,596 B1, a random number is generated per pixel, and frequency filter processing and scale changing are performed to superpose the granular pattern having expected granularity onto the image. Moreover, in JP11-85955A, a granular pattern is obtained by subtracting a smoothed image from an exposed image obtained from color film exposed uniformly.

SUMMARY OF THE INVENTION

According to a first aspect of the present invention, there is provided an image processing apparatus comprising a synchronization processing unit that generates an image data having a plurality of color components per pixel based on the image data obtained by an imaging apparatus which includes an image sensor arranged with a plurality of color filters, and a granular pattern addition unit that adds a predetermined granular pattern to the image data generated by the synchronization processing unit.

According to a second aspect of the present invention, there is provided an image processing apparatus comprising a granular pattern addition unit that adds a predetermined granular pattern to an image data subjected to predetermined image processing including at least first gradation conversion processing, and a gradation conversion unit that performs second gradation conversion processing different from the first gradation conversion processing to the image data to which the predetermined granular pattern is added.

According to a third aspect of the present invention, there is provided an image processing method comprising a first step of generating an image data having a plurality of color components per pixel based on the image data obtained by an imaging apparatus which includes an image sensor arranged with a plurality of color filters, and a second step of adding a predetermined granular pattern to the generated image data.

According to a fourth aspect of the present invention, there is provided a computer readable recording medium storing an image processing program that is executed by a computer. The image processing program comprises a first step of generating an image data having a plurality of color components per pixel based on the image data obtained by an imaging apparatus which includes an image sensor arranged with a plurality of color filters, and a second step of adding a predetermined granular pattern to the generated image data.

According to a fifth aspect of the present invention, there is provided an imaging apparatus comprising an imaging unit that obtains a first image data by imaging a photographic subject, an image processing unit that generates a second image data by performing image processing to the first image data, a size setting unit that sets recording size to which the image is recorded, a reduced image data generation unit that generates a third image data by reducing the second image data based on the recording size set by the size setting unit and on size of the second image data, a granular pattern addition mode setting unit that sets granular pattern addition mode in which a predetermined granular pattern is added to the second image data or the third image data, a granular pattern addition unit that adds the predetermined granular pattern to the third image data if the recording size set by the size setting unit is size to which the second image data is reduced, and adds the predetermined granular pattern to the second image data if the recording size set by the size setting unit is size of the second image data, when the granular pattern addition mode is being set by the granular pattern addition mode setting unit.

According to a sixth aspect of the present invention, there is provided an imaging apparatus comprising an imaging unit that obtains a first image data by imaging a photographic subject, an image processing unit that generates a second image data by performing image processing to the first image data, a size setting unit that sets recording size to which the image is recorded, a reduced image data generation unit that generates a third image data by reducing the second image data with a predetermined reduction ratio based on the recording size set by the size setting unit and size of the second image data, a granular pattern enlargement unit that enlarges granular pattern to be added to the image data with an enlargement ratio that corresponds to the predetermined reduction ratio, a granular pattern addition mode setting unit that sets a granular pattern addition mode in which a predetermined granular pattern is added to the image data, and a granular pattern addition unit that adds granular pattern to the image data. The reduced image data generation unit reduces the second image data to which the enlarged granular pattern is added with the predetermined reduction ratio after the granular pattern addition unit adds the enlarged granular pattern to the second image data if the recording size set by the size setting unit is the size to which the second image data is reduced, when the granular pattern addition mode is being set by the granular pattern addition mode setting unit.

According to a seventh aspect of the present invention, there is provided an image processing apparatus which adds a predetermined granular pattern to an input image data. The image processing apparatus comprises a first granular pattern addition unit that adds the predetermined granular pattern to the input image data, a reduced image data generation unit that generates a reduced image data having smaller number of pixels than the input image data, and a second granular pattern addition unit that adds the predetermined granular pattern to the reduced image data.

According to an eighth aspect of the present invention, there is provided an image processing apparatus which adds a predetermined granular pattern to an input image data. The image processing apparatus comprises a reduced image data generation unit that generates a reduced image data having smaller number of pixels than the input image data with a predetermined reduction ratio, a granular pattern enlargement unit that enlarges the predetermined granular pattern with an enlargement ratio corresponding to the predetermined reduction ratio, and a granular pattern addition unit that adds the enlarged granular pattern to the input image data, and wherein the reduced image data generation unit reduces the image data to which the enlarged granular pattern is added with the predetermined reduction ratio.

According to a ninth aspect of the present invention, there is provided an image processing method in which a predetermined granular pattern is added to an image data comprising a step of generating a reduced image data having smaller number of pixels than the image data and a step of adding the predetermined granular pattern to the reduced image data.

According to a tenth aspect of the present invention, there is provided an image processing method in which a predetermined granular pattern is added to an image data, comprising a step of enlarging the predetermined granular pattern with an enlargement ratio corresponding to a predetermined reduction ratio, a step of adding the enlarged granular pattern to the image data and a step of reducing the image data to which the enlarged granular pattern is added with the predetermined reduction ratio.

According to an eleventh aspect of the present invention, there is provided a computer readable recording medium storing an image processing program for causing a computer to execute processing of adding a predetermined granular pattern to an image data. The image processing program comprises a step of generating a reduced image data having smaller number of pixels than the image data, and a step of adding the predetermined granular pattern to the reduced image data.

According to a twelfth aspect of the present invention, there is provided a computer readable recording medium storing an image processing program for causing a computer to execute processing of adding a predetermined granular pattern to an image data. The image processing program comprises a step of enlarging the predetermined granular pattern with an enlargement ratio corresponding to a predetermined reduction ratio, a step of adding the enlarged granular pattern to the image data, and a step of reducing the image data to which the enlarged granular pattern is added with the predetermined reduction ratio.

BRIEF DESCRIPTION OF THE DRAWINGS

FIG. 4 is a diagram showing an example of various types of gains, imaging noise and image noise in the normal mode.

FIG. 5 is a diagram showing an example of various types of gains, imaging noise, and image noise in the silver halide mode.

FIG. 6 is a diagram showing an example of various types of gains, imaging noise and image noise upon editing JPEG compressed data.

DESCRIPTION OF THE PREFERRED EMBODIMENTS

First Embodiment

Figure 1:
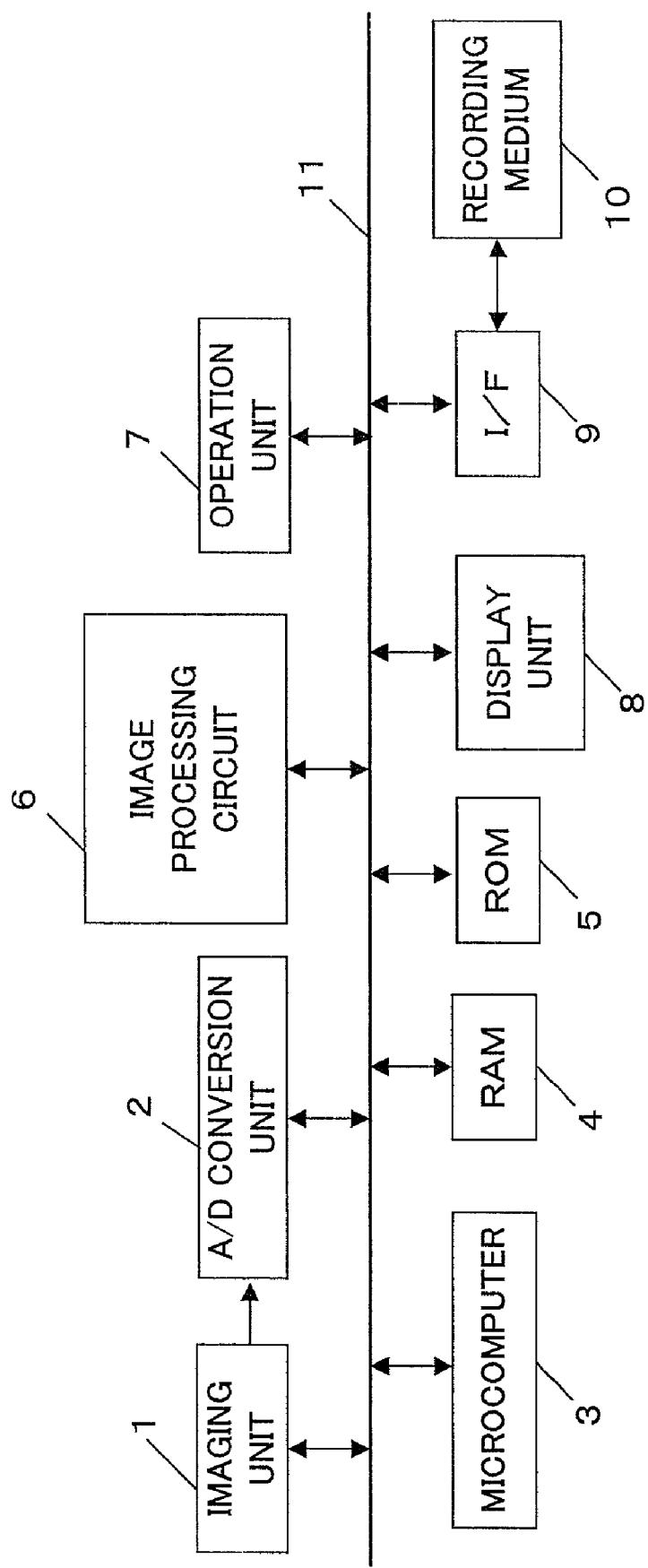
FIG. 1 is a block diagram showing the constitution of a digital camera including an image processing apparatus according to the first embodiment.

FIG. 1 is a block diagram showing the constitution of a digital camera including an image processing apparatus according to the first embodiment. This digital camera includes an imaging unit 1, an A/D conversion unit 2, a microcomputer 3, a RAM 4, a ROM 5, an image processing circuit 6, an operation unit 7, a display unit 8, a memory interface 9 (hereinafter referred to as an "I/F 9"), and a recording medium 10.

The imaging unit 1 includes a single chip type color image sensor (hereinafter referred to as an "image sensor") in which a plurality of color filters are arranged in front of the photodiodes which constitute each pixel, as well as an imaging optical system and their drive units. For example, the color filters are arranged in a Bayer arrangement. The Bayer arrangement has a type of line in which R pixels and G (Gr) pixels are arranged alternately in a horizontal direction, and a type of line in which G (Gb) pixels and B pixels are arranged alternately, and the two types of lines are also allocated alternately in a perpendicular direction. The image sensor receives the light condensed with the lens (not illustrated) at the photodiode which constitutes a pixel and performs photoelectric conversion of the light, and outputs the amount of the light as an amount of electric charges to the A/D conversion unit 2. It should be noted that the image sensor may be a CCD type or a CMOS type. Moreover, a color filter may be configured in an arrangement other than the Bayer arrangement, and may consist of colors other than R, G, and B.

The A/D conversion unit 2 converts the electric signal output from the imaging unit 1 into a digital image signal (hereinafter referred to as "image data").

The microcomputer 3 is a control unit which performs general control of the digital camera. For example, the microcomputer 3 performs focal control of the imaging optical system and exposure control of the image sensor in the imaging unit 1, recording control to record the image data in the storage medium 10, and display control to display the image data on the display unit 8.

The RAM 4 is a memory unit which stores temporally various kinds of data, such as the image data acquired at the A/D conversion unit 2 and the image data processed at the image processing circuit 6, which will be described later. The ROM 5 stores various types of parameters required for the operation of the digital camera, the data of the granular pattern imitated to the granular feeling of the silver halide particles and so on. The granular pattern data is obtained by a known method, is divided into a Y (brightness) component and a C (color) component and is stored in the ROM 5 in advance. Moreover, the ROM 5 also stores various types of programs to be executed on a microcomputer 3. The microcomputer 3 reads from the ROM 5 parameters that are required for various types of sequences and executes each processing according to the program stored in the ROM 5.

The image processing circuit 6 performs various types of image processing to the image data read from the RAM 4. The details of the image processing performed at the image processing circuit 6 will be described later. The image data subjected to image processing at the image processing circuit 6 is recorded in the recording medium 10 via the I/F 9. The recording medium 10 is, for example, a memory card which can be detached from and attached to the body of the digital camera, but it is not limited to this.

The operation unit 7 includes operation members such as a power button, a release button, various types of input keys and so on. The microcomputer 3 performs various types of sequences according to the operation of either of the operation members of the operation unit 7 performed by the user. The power button is an operation member for performing ON/OFF indications of the power of the digital camera. When the power button is pushed, the microcomputer 3 turns on or turns off the power of the digital camera. The release button is arranged to include a two-step switch, which consists of a first release switch and a second release switch. When the release button is half-pushed so that the first release switch is turned on, the microcomputer 3 performs a shooting preparation sequence including AE processing, AF processing and so on. When the release button is fully-pushed so that the second release switch is turned on, the microcomputer 3 performs a shooting sequence to shoot. The recording modes of the image and the shooting modes can be set with the operation unit 7.

The bus 11 is a transfer line for transferring various types of data generated inside the digital camera to each unit in the digital camera. The bus 11 is connected to the imaging unit 1, the A/D conversion unit 2, the microcomputer 3, the RAM 4, the ROM 5, the image processing circuit 6, the operation unit 7, the display unit 8, and the I/F 9.

Figure 2:
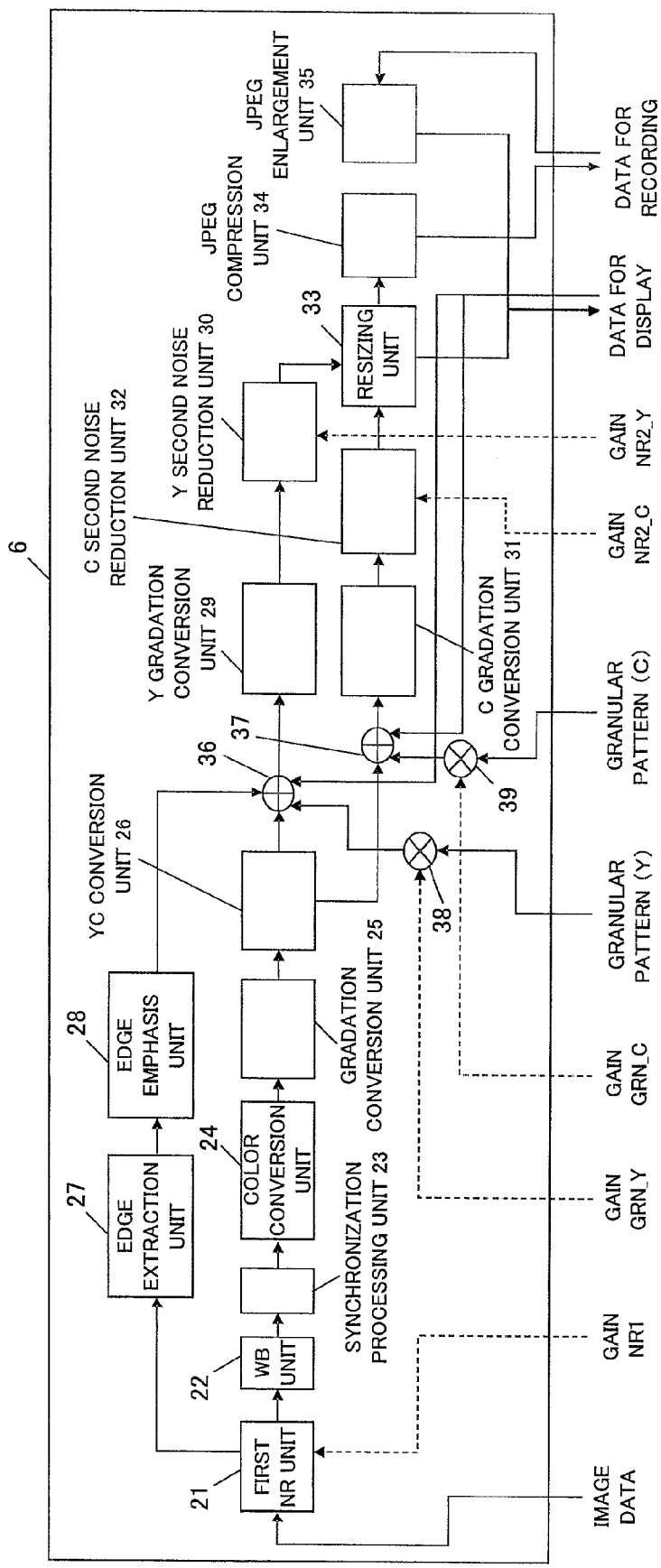
FIG. 2 is a block diagram showing a detailed constitution of the image processing circuit.

FIG. 2 is a block diagram showing a detailed constitution of the image processing circuit 6. The image processing circuit 6 includes a first noise reduction unit 21 (first NR unit in the figure), a white balance adjustment unit 22 (WB unit in the figure), a synchronization processing unit 23, a color conversion unit 24, a gradation conversion unit 25, a YC conversion unit 26, an edge extraction unit 27, an edge emphasis unit 28, a Y gradation conversion unit 29, a Y second noise reduction unit 30 (Y second NR unit in the figure), a C gradation conversion unit 31, a C second noise reduction unit 32 (C second NR unit in the figure), a resizing unit 33, a JPEG compression unit 34, a JPEG enlargement unit 35, addition units 36, 37, and multiplication units 38, 39.

The first noise reduction unit 21 performs noise reduction processing to the image data converted at the A/D conversion unit 2 and stored in RAM 4, based on the noise reduction gain NR1, which will be described later. In this noise reduction processing, a pixel defect of the image sensor is corrected, and random noise generated upon the imaging is reduced. However, it may be possible to process at least one type of processing to correct the pixel defect of the image sensor and processing to reduce random noise generated upon the imaging.

The white balance adjustment unit 22 performs the processing to adjust the white balance of the image data after the noise reduction.

The synchronization processing unit 23 performs synchronization processing to generate the image data based on color information consisting of R, G, and B per pixel from the image data based on the Bayer arrangement. The synchronization processed image data is subjected to predetermined color conversion processing at the color conversion unit 24, and thereafter, gradation conversion processing (first gradation conversion process) at the gradation conversion unit 25.

The YC conversion unit 26 converts the image data subjected to the gradation conversion processing into the Y (luminance) signal and the C (color) signal. The converted Y signal is output to the addition unit 36, and the converted C signal is output to the addition unit 37.

The edge extraction unit 27 performs the processing to extract the edge from the image data subjected to noise reduction processing at the first noise reduction unit 21. The edge emphasis unit 28 performs edge emphasis processing by multiplying the data of the edge extracted in the edge extraction unit 27 by a predetermined gain.

The multiplication unit 38 multiplies Y component data of the granular pattern stored in the ROM 5 by the gain GRN_Y, which will be described later, and outputs the result to the addition unit 36. The addition unit 36 adds the edge data input from the edge emphasis unit 28, and the Y component data of the granular pattern input from the multiplication unit 38 to the Y signal. The Y signal is input from the YC conversion unit 26 to the addition unit 36 upon the shooting and editing of RAW data, and is input from the RAM 4 when editing the JPEG compressed data. The Y signal output from the addition unit 36 is subjected to gradation conversion processing (second gradation conversion processing), which will be described later, at the Y gradation conversion unit 29, and thereafter, is subjected to processing to reduce noise at the Y second noise reduction unit 30.

The multiplication unit 39 multiplies C component data of the granular pattern stored in the ROM 5 by the gain GRN_C, which will be described later, and outputs the result to the addition unit 37. The addition unit 37 adds the C component data of the granular pattern input from the multiplication unit 39 to the C signal. The C signal is input from the YC conversion unit 26 to the addition unit 37 upon the shooting and editing of RAW data, and is input from the RAM 4 when editing the JPEG compressed data. The C signal output from the addition unit 37 is subjected to gradation conversion processing (second gradation conversion processing), which will be mentioned later, at the C gradation conversion unit 31, and thereafter, is subjected to processing to reduce noise at the C second noise reduction unit 32.

The resizing unit 33 resizes the Y signal and the C signal subjected to the noise reduction processing according to the image size to which the image is recorded. The JPEG compression unit 34 performs JPEG compression to the resized Y signal and C signal. The data subjected to the JPEG compression is recorded to the recording medium 10 via the I/F 9. The JPEG enlargement unit 35 reads the JPEG compressed data recorded in the recording medium 10 and performs enlargement processing to restore it to the condition before the compression.

=Processing Flow When Shooting=

Figure 3A:
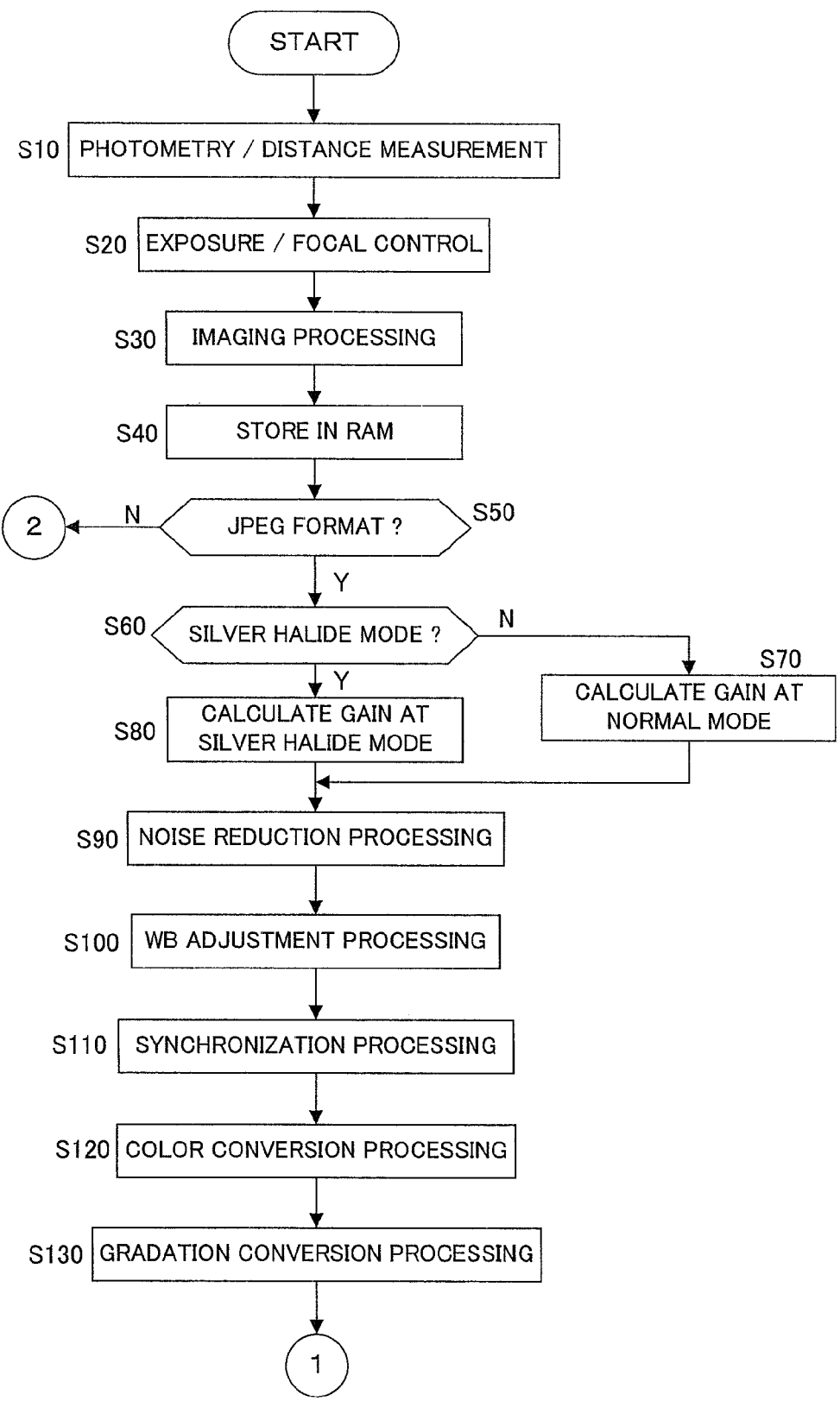
FIG. 3A is a flowchart showing a former part of the processing upon the shooting by the digital camera including the image processing apparatus according to the first embodiment.
Figure 3B:
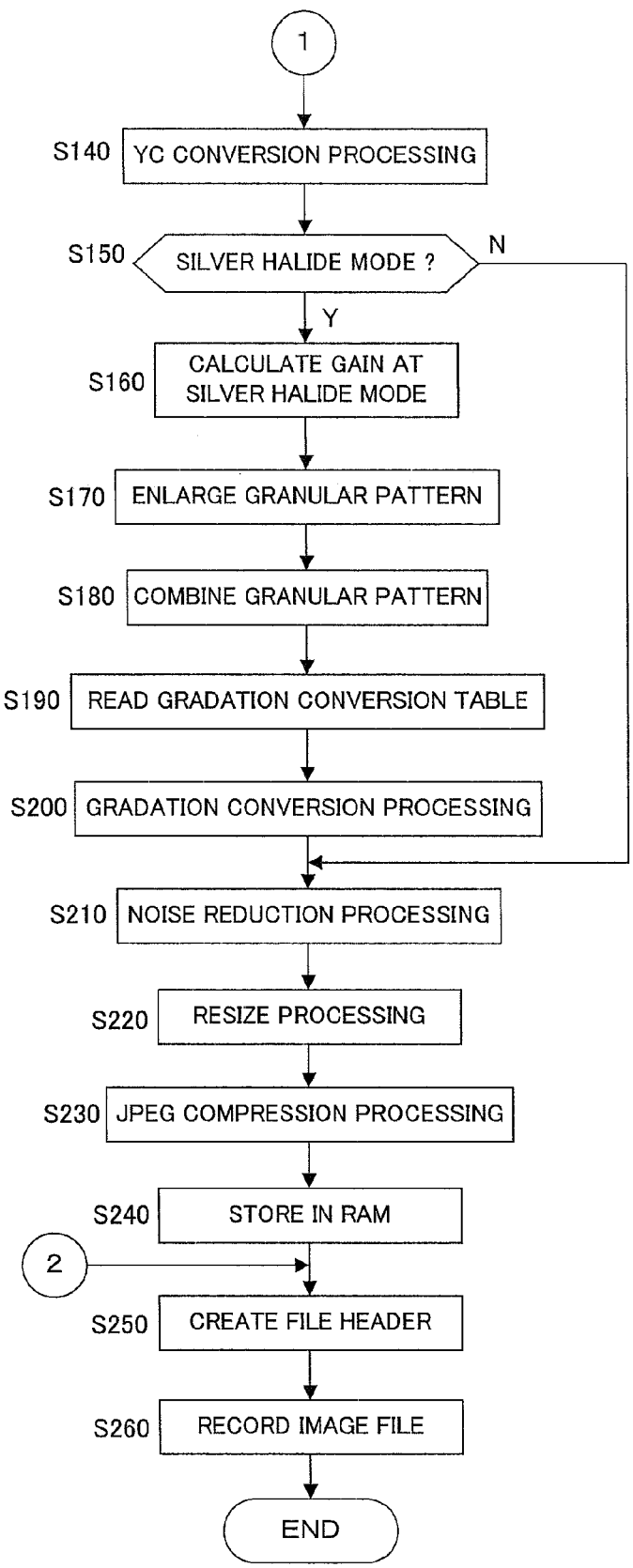
FIG. 3B is a flowchart showing a later part of the processing upon the shooting by the digital camera including the image processing apparatus according to the first embodiment.

FIG. 3A and FIG. 3B are flowcharts of the processing flows upon the shooting by the digital camera including the image processing apparatus according to the first embodiment. When the user presses the release button, the processing of step S10 starts.

In step S10, well-known photometry processing and well-known distance measurement processing are performed. Then, in step S20, well-known exposure control and focal control are performed. In step S30, the imaging processing is performed in the imaging unit 1. In step S40, after imaging processing is performed at the imaging unit 1, the image data obtained by processing the A/D conversion processing at the A/D conversion unit 2 is stored in the RAM 4 temporarily.

In step S50, it is determined whether the recording format of the image is JPEG format or RAW format. The recording format of the image can be set up by the user operating the operation unit 7 before the shooting. If it is determined that the recording format of the image is JPEG format, the process proceeds to step S60, and if it is determined that it is RAW format, the process proceeds to step S250 in FIG. 3B.

In step S60, it is determined whether the recording mode of the image is the silver halide mode or the normal mode. The silver halide mode is a mode in which the granular pattern which imitates the granular feeling of the silver halide particles is superposed on the image data in order to obtain similar visual effects with the silver halide photography. The recording mode of the image can be set up by the user operating the operation unit 7 before shooting. If the recording mode is determined as the normal mode, the process proceeds to step S70.

In step S70, the noise reduction gain NR1 at the normal mode is calculated. FIG. 4 is a diagram showing an example of various types of gains, imaging noise, and image noise at the normal mode. Various gains include gain NR1 which is used upon performing the noise reduction processing at the first noise reduction unit 21, gain GRN_Y which is multiplied to the Y component of the granular pattern, gain GRN_C which is multiplied to the C component of the granular pattern, gain NR2_Y which is used upon processing the noise reduction processing at the Y second noise reduction unit 30, and gain NR2_C which is used upon performing the noise reduction processing at the C second noise reduction unit 32.

Various gains are decided according to the ISO sensitivity set up upon the shooting. For example, if the ISO sensitivity is 800, the gain NR1 is 4, the gain NR2_Y is 2, and the gain NR2_C is 2. However, in the normal mode, since the processing to superpose the granular pattern to the image data is not performed, the space for the gain GRN_Y and GRN_C is blank. It is to be noted that the gain GRN_Y and the GRN_C may be set to 0, respectively, so as to perform processing to superpose the granular pattern.

The imaging noise corresponding to each ISO sensitivity is based on the imaging noise in the case where ISO sensitivity is 100, and it shows the smaller the value is, the larger the noise is. In other words, the larger the ISO sensitivity is, the larger the imaging noise is. Similarly, the image noise is based on the image noise in the case where ISO sensitivity is 100, and it shows that the smaller the value is, the larger the noise is. Therefore, the larger the ISO sensitivity is, the larger the image noise is.

The ROM 5 stores a data table that defines various types of gain corresponding to each of the ISO sensitivities as shown in FIG. 4. The data table is read from the ROM 5 to calculate the gain NR1 in accordance with the ISO sensitivity upon the shooting. It is to be noted that the larger the value of the gain NR1 is, the larger the noise reduction effect upon the noise reduction processing is.

If, on the other hand, it is determined that the recording mode of the image is the silver halide mode in step S60, the process proceeds to step S80. In step S80, the noise reduction gain NR1 in the silver halide mode is calculated. FIG. 5 is a diagram showing an example of various types of gains, imaging noise, and image noise in the silver halide mode. How to see the various types of gains, imaging noise, and image noise in FIG. 5 is the same as in FIG. 4.

In the silver halide mode, in order to maintain the granular feeling in the final image data constant regardless of the ISO sensitivity, the intensity (gain GRN_Y, GRN_C) of the granular pattern to be combined and the intensity (gain NR2_Y, NR2_C) of the noise reduction after combination of the granular pattern are controlled in accordance with the amplification of the imaging noise corresponding to the ISO sensitivity. Here, the higher the ISO sensitivity is, the gains GRN_Y and GRN_C are made smaller, so that the intensity of the granular pattern to be combined to the image data becomes weaker. As shown in FIG. 5, the image noise of the image data to which the granular pattern is added is constant regardless of the ISO sensitivity.

Moreover, in order to maintain the granular feeling of the granular pattern to be superposed on the image data, the gain NR2_Y and the gain NR2_C are set weaker than those in the normal mode. Furthermore, as to the intensity of the granular pattern, the color difference (C) is set relatively weaker than the luminance (Y), in order to prevent needless color noise.

The ROM 5 stores a data table which defines various types of gains corresponding to the ISO sensitivities as shown in FIG. 5. The data table is read from the ROM 5 to calculate the gain NR1 in accordance with the ISO sensitivity upon the shooting.

In step S90, the first noise reduction unit 21 reads the image data stored in the RAM 4, and performs the processing to reduce the noise using the noise reduction gain NR1 which is calculated in step S70 or step S80.

In step S100, the white balance adjustment unit 22 performs the processing to adjust white balance of the image data subjected to the noise reduction processing. In step S110, the synchronization processing unit 23 performs synchronization processing, and in step S120, the color conversion unit 24 performs color conversion processing.

Figure 7:
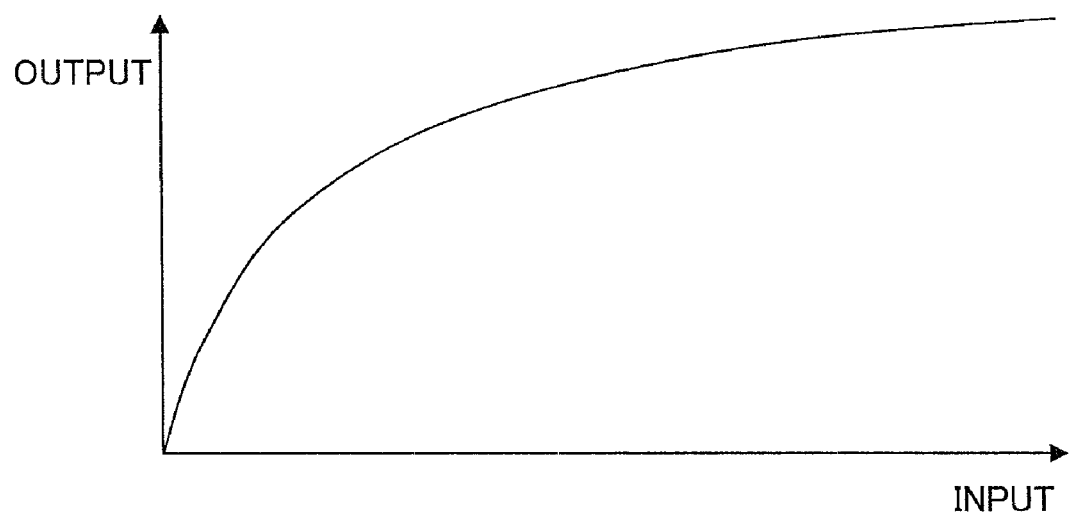
FIG. 7 is a diagram showing an example of gradation conversion characteristics of the gradation conversion processing prior to combining the granular pattern.

In step S130, the gradation conversion unit 25 performs gradation conversion processing. Here, gradation conversion processing is performed so as to expand the dark region and to compress the bright region, considering the gamma characteristics of the display unit 8. FIG. 7 is a diagram showing an example of gradation conversion characteristics upon performing the gradation conversion processing in step S130. After performing the gradation conversion processing, the process proceeds to step S140 in FIG. 3B.

In step S140, the YC conversion unit 26 converts the image data subjected to the gradation conversion processing into the Y (luminance) signal and the C (color) signal.

In step S150, it is determined whether the recording mode of the image is the silver halide mode or the normal mode. This determination is the same determination as in step S60. If it is determined that the recording mode of the image is the normal mode, the process proceeds to step S210, and if it is determined that it is the silver halide mode, the process proceeds to step S160.

In step S160, the gain GRN_Y and the gain GRN_C in the silver halide mode are calculated. Upon calculating the gains GRN_Y, GRN_C, the aforementioned data table as shown in FIG. 5 is read from the ROM 5 to calculate the gains GRN_Y, GRN_C, in accordance with the ISO sensitivity upon the shooting.

In step S170, the Y component data of the granular pattern is read from the ROM 5, and the gain GRN_Y calculated in step S160 is multiplied by the read Y component data of the granular pattern at the multiplication unit 38. Moreover, the C component data of the granular pattern is read from the ROM 5, and the gain GRN_C calculated in step S160 is multiplied by the read C component data of the granular pattern at the multiplication unit 39.

In step S180, the addition unit 36 adds the edge data input from the edge emphasis unit 28 and the Y component data of the granular pattern input from the multiplication unit 38 to the Y signal converted at the YC conversion unit 26. Moreover, the addition unit 37 adds the C component data of the granular pattern input from the multiplication unit 39 to the C signal converted at the YC conversion unit 26.

In step S190, the Y gradation conversion unit 29 reads the gradation conversion table for the Y signals from the ROM 5, and the C gradation conversion unit 31 reads the gradation conversion table for the C signals from the ROM 5.

Figure 8:
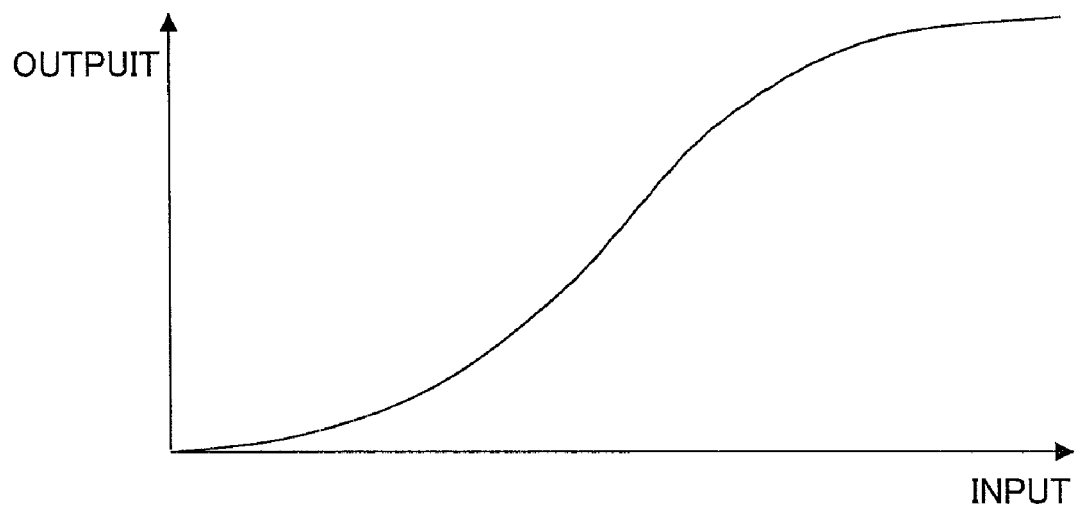
FIG. 8 is a diagram showing an example of gradation conversion characteristic upon performing the gradation conversion processing of the Y signal.

FIG. 8 is a diagram showing an example of gradation conversion characteristic upon performing the gradation conversion processing of the Y signal. In the gradation conversion characteristic, the contrast of the image data is emphasized, that is, the dark region and the bright region are compressed and the intermediate gradation is expanded.

Figure 9:
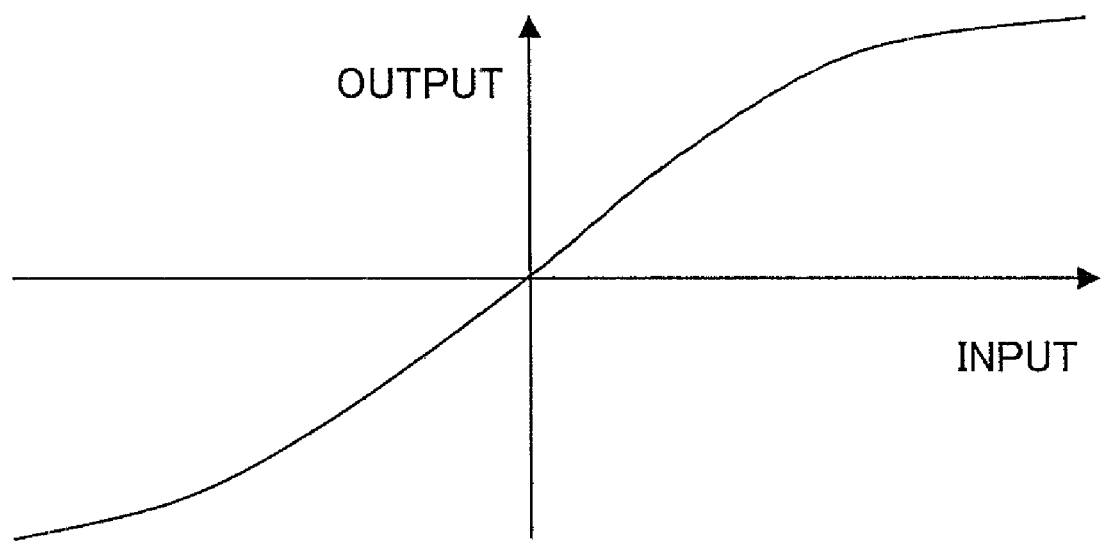
FIG. 9 is a diagram showing an example of gradation conversion characteristic upon performing the gradation conversion processing of the C signal.

FIG. 9 is a diagram showing an example of the gradation conversion characteristic upon performing the gradation conversion processing of the C signal. The ROM 5 stores the gradation conversion table of the gradation conversion characteristic as shown in FIG. 8, and the gradation conversion table of the gradation conversion characteristic as shown in FIG. 9. Upon reading the gradation conversion tables from the ROM 5, the process proceeds to step S200.

In step S200, the Y gradation conversion unit 29 performs gradation conversion processing to the Y signal input from the addition unit 36 using the gradation conversion table for the Y signal read in step S190, and the C gradation conversion unit 31 performs gradation conversion processing to the C signal input from the addition unit 37 using the gradation conversion table for the C signal read in step S190.

In step S210, the Y second noise reduction unit 30 performs noise reduction processing to the Y signal after the gradation conversion processing, and the C second noise reduction unit 32 performs noise reduction processing to the C signal after the gradation conversion processing. In the noise reduction processing, the gains NR2_Y, NR2_C are used in accordance with the normal mode or the silver halide mode. For example, if it is determined that the normal mode is set in step S150, the data table as shown in FIG. 4 is read from the ROM 5 to obtain the gains NR2_Y, NR2_C in accordance with the ISO sensitivity upon the shooting. Moreover, in step S150, when it is determined that the silver halide mode is set, the process proceeds to read the data table as shown in FIG. 5 to obtain the gains NR2_Y, NR2_C in accordance with the ISO sensitivity upon the shooting. The Y second noise reduction unit 30 performs noise reduction processing of the Y signal using the gain NR2_Y, and the C second noise reduction unit 32 performs noise reduction processing of the C signal using the gain NR2_C.

In step S220, the resizing unit 33 resizes the Y signal and the C signal subjected to the noise reduction processing according to the image size upon the recording. In step S230, the JPEG compression unit 34 performs JPEG compression to the resized Y signal and C signal. In step S240, the Y signal and the C signal subjected to the JPEG compression are stored into the RAM 4.

In step S250, the shooting information such as the recording mode of the image and the exposure condition is created as file header information. In step S260, the created file header information is added to the data which is JPEG compressed and temporarily stored in the RAM 4, to be recorded in the recording medium 10 via the I/F 9.

=Processing Flow Upon Editing RAW Data=

In the flowchart in FIG. 3A which shows the processing flow upon shooting, if it is determined that the recording format of the image is RAW format in step S50, image processing on and after step S60 is not performed, and the data is recorded in the recording medium 10 as RAW data. Hereinafter, the processing in which the RAW data recorded in the recording medium 10 is read and the image processing is performed will be described.

Figure 10:
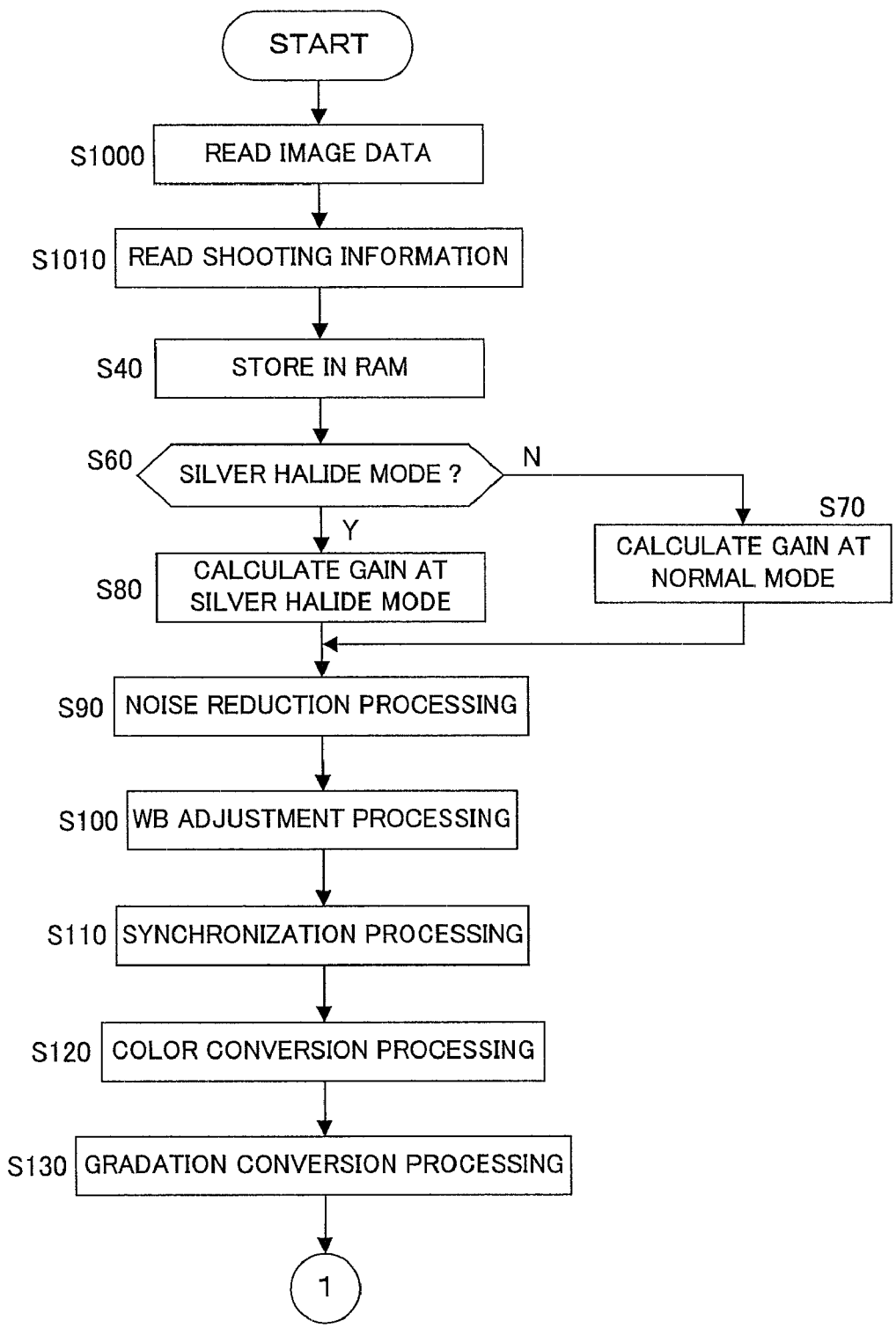
FIG. 10 is a flowchart showing the processing flow upon editing the RAW data.

FIG. 10 is a flowchart which shows the processing flow upon editing the RAW data. In the flowchart in FIG. 10, the same numbers are assigned to the steps in which the same processing is performed as the processing of the flowchart in FIG. 3A, and the detailed description are omitted. Moreover, since the processing after step S130 in FIG. 10 is the same as the processing of the flowchart shown in FIG. 3B, the drawings and the descriptions are omitted.

In step S1000, the image data in RAW format is read from the recording medium 10 via the I/F 9. In step S1010, shooting information is read from the file header information added to the image data. In step S40, the read image data and shooting information are stored in the RAM 4.

The processing on and after step S60 is the same as the processing of the flowcharts shown in FIG. 3A and FIG. 3B.

=Processing Upon Editing the JPEG Compressed Data=

In the flowcharts in FIG. 3A and FIG. 3B which show the processing flow upon the shooting, if it is determined in step S60 and step S150 that the recording mode of the image is the normal mode, the granular pattern imitating the granular feeling of the silver halide particles is not superposed on the image data. Hereinafter, processing in which the image data recorded in the normal mode upon the shooting is read, the granular pattern imitating the granular feeling of the silver halide particles is superposed on the image data and the processed image data is recorded in the recording medium 10 will be described.

Figure 11:
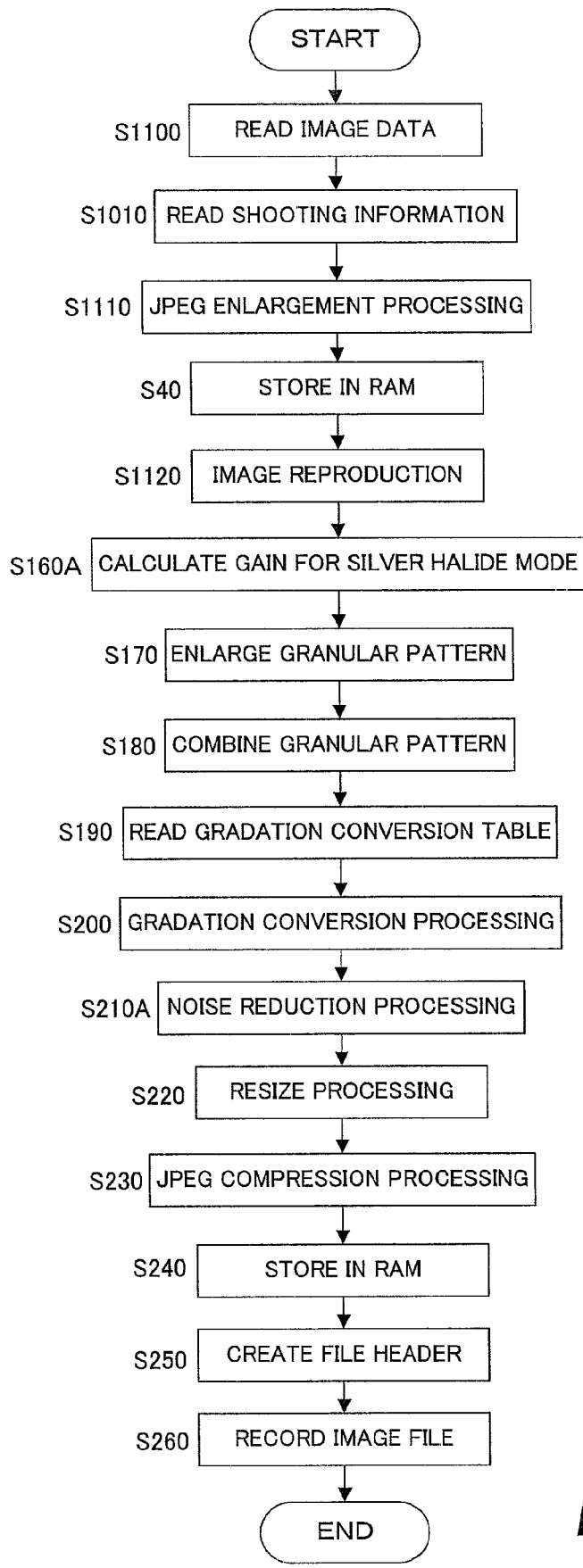
FIG. 11 is a flowchart showing the processing flow upon editing the JPEG compressed data.

FIG. 11 is a flowchart showing the processing flow upon editing the JPEG compressed data. In the flowchart in FIG. 11, the same numbers are assigned to the steps in which the same processing is performed as the flowcharts in FIG. 3A, FIG. 3B, and FIG. 10, and detailed descriptions are omitted.

In step S1100, the JPEG compressed image data is read from the recording medium 10 via the I/F 9.

In step S1110, the JPEG enlargement unit 35 performs enlargement processing to restore the image data read in step S1100 to the condition before being subjected to the JPEG compression. The image data subjected to the enlargement processing, and the shooting information read in step S1010 are stored in the RAM 4 in step S40.

In step S1120, the image data stored in the RAM 4 is displayed on the display unit 8. Thereby, the user can check the image to be superposed on the granular pattern.

In step S160A, gains GRN_Y, GRN_C in the silver halide mode upon editing the JPEG compressed data are calculated. FIG. 6 is a diagram showing an example of the data table used in the processing upon editing the JPEG compressed data. In FIG. 6, how to see various types of gains, imaging noise, and image noise is the same as in FIG. 4 and FIG. 5.

At the time of editing the JPEG compressed data, in order to obtain the image quality equivalent to the image quality obtained upon the shooting processing in the silver halide mode, the intensity (GRN_Y, GRN_C) of the granular pattern and the noise reduction intensity (NR2_Y, NR2_C) after the combination are controlled by considering the ISO sensitivity and the gain NR1 upon the shooting in the normal mode.

The ROM 5 stores a data table in which various types of gains according to the ISO sensitivity are defined, as shown in FIG. 6. This data table is read to calculate the gains GRN_Y, GRN_C according to the ISO sensitivity upon the shooting.

In step S210A, the Y second noise reduction unit 30 performs processing to reduce noise of the Y signal subjected to the gradation conversion processing, and the C second noise reduction unit 32 performs processing to reduce noise of the C signal subjected to the gradation conversion processing. Here, the data table as shown in FIG. 6 is read from the ROM 5 to obtain gains NR2_Y, NR2_C in accordance with the ISO sensitivity upon the shooting. The Y second noise reduction unit 30 performs noise reduction processing of the Y signal using the obtained gain NR2_Y, and the C second noise reduction unit 32 performs noise reduction processing of the C signal using the obtained gain NR2_C.

According to the image processing apparatus in accordance with the first embodiment, after synchronization processing is performed to the image data, processing to add a predetermined granular pattern to the image data is performed. By performing synchronization processing after adding the granular pattern, the granular feeling of the silver halide photograph can be reproduced appropriately, avoiding problems such as losing the fine granular feeling peculiar to silver halide particles and generating a geometrical pattern that is not in the original image by recognizing the granular pattern falsely as the structure of the image.

Moreover, according to the image processing apparatus of the first embodiment, first gradation conversion processing is performed to the image data to which synchronization processing is performed, and a predetermined granular pattern is added to the image data after the gradation conversion processing. Thereby, spoiling the granular feeling caused because of the granular pattern at dark regions being emphasized can be prevented by performing the gradation conversion processing after adding the granular pattern.

Furthermore, in accordance with the image processing apparatus of the first embodiment, since the second gradation conversion processing which is different from the first gradation conversion processing is performed to the image data to which the granular pattern is added, both the intrinsic gradation characteristics of the image and the control of the granular feeling in accordance with the gradation level can be achieved. Since this second gradation conversion processing is performed for emphasizing the contrast of the image data, the granular feelings in the highlight region and the shadow region are reduced, while the granular feeling of the intermediate gradation is emphasized so that the peculiar granular feeling which silver halide photographs have can be expressed.

Moreover, in accordance with the image processing apparatus of the first embodiment, the edge used in the edge emphasis processing is extracted from the image data before the predetermined granular pattern is added. If processing to extract edge from the image data subjected to the addition of the granular pattern is performed, a region which is not edge may be wrongly extracted. However, by extracting edge from the image data before the granular pattern is added, it is possible to avoid wrongly extracting the edge.

Moreover, in accordance with the image processing apparatus in the first embodiment, since the intensity of the granular pattern added to the image data is adjusted, the desired granular pattern can be added. Especially, since the intensity of the granular pattern is adjusted according to the imaging sensitivity upon the shooting, a suitable granular pattern can be added in consideration of the noise component generated according to the imaging sensitivity.

Furthermore, in accordance with the image processing apparatus in the first embodiment, predetermined noise reduction processing is performed to the image data obtained by the imaging apparatus that includes an image sensor arranged with a plurality of color filters, and synchronization processing is performed to the image data subjected to the noise reduction processing, and thereafter, a predetermined granular pattern is added. Thereby, the granular feeling of a silver halide photograph can be appropriately reproduced.

Moreover, in accordance with the image processing apparatus of the first embodiment, the degree of noise reduction processing and the intensity of the predetermined granular pattern which is added to the image data are controlled according to the imaging sensitivity upon the shooting by the imaging apparatus. Therefore, a suitable granular pattern can be added by considering the noise component generated in accordance with the imaging sensitivity. Especially, the degree of the noise reduction processing and the intensity of the predetermined granular pattern are controlled so that the granular feeling of the predetermined granular pattern which is added to the image data is about the same even in a case where the imaging sensitivity upon the shooting differs. Therefore, high resolution can be maintained and desirable granularity can be obtained stably regardless of the imaging sensitivity.

Second Embodiment

Figure 12:
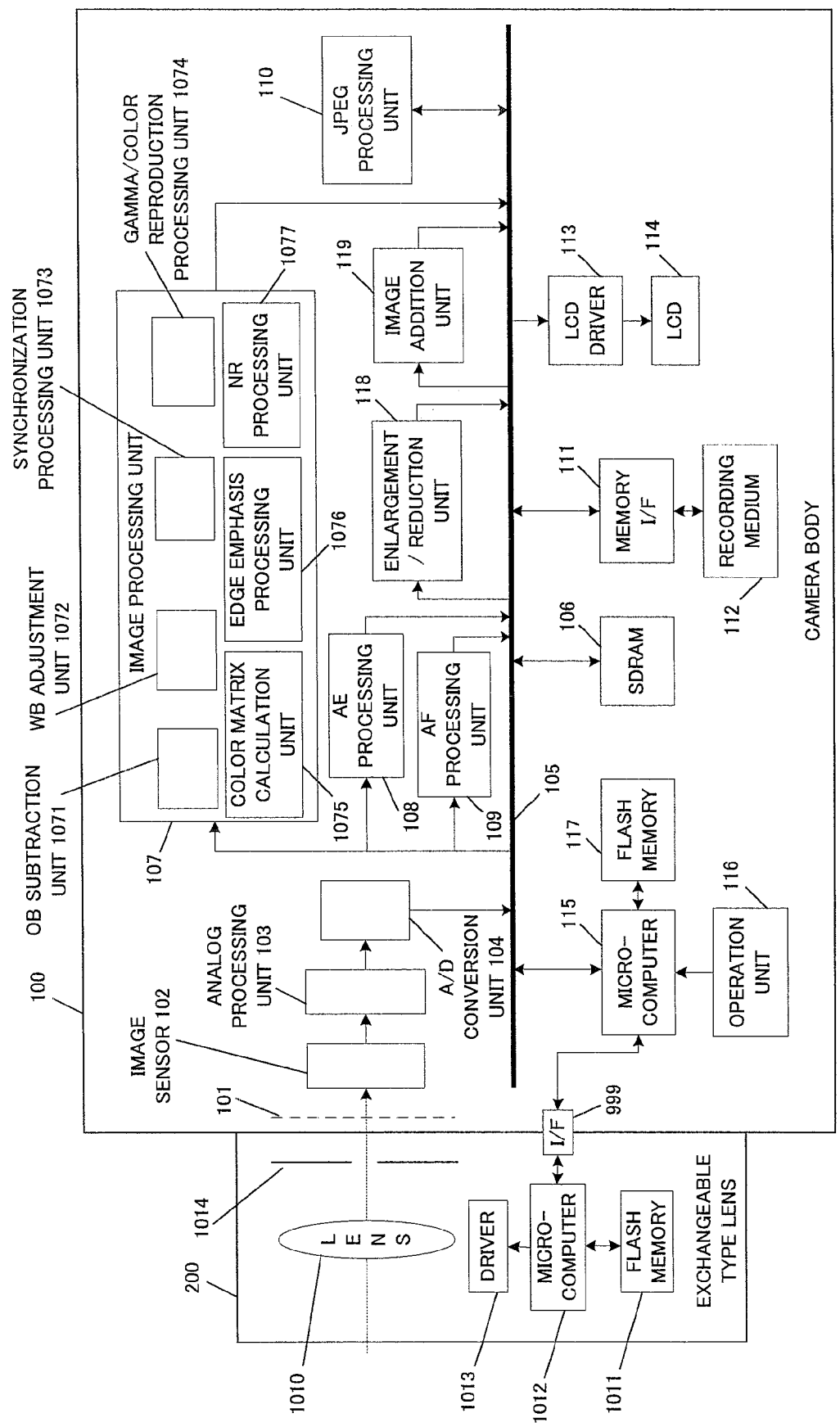
FIG. 12 is a block diagram showing a constitution of a digital still camera to which an image processing apparatus according to the second embodiment is applied.

FIG. 12 is a block diagram showing a constitution of a digital still camera to which an image processing apparatus according to the second embodiment is applied. The digital still camera shown in FIG. 12 includes a camera body 100 and an exchangeable type lens 200.

The exchangeable type lens 200 includes a lens 1010, a flash memory 1011, a microcomputer 1012, a driver 1013, and a diaphragm 1014. The exchangeable type lens 200 is connected with the camera body 100 via the interface 999 (hereinafter referred to as an "I/F 999") enabling communication.

The camera body 100 includes a mechanical shutter 101, an image sensor 102, an analog processing unit 103, an analog-to-digital conversion unit 104 (hereinafter referred to as an "A/D conversion unit 104"), a bus 105, a SDRAM 106, an image processing unit 107, an AE processing unit 108, an AF processing unit 109, a JPEG processing unit 110, a memory interface 111 (hereinafter referred to as a "memory I/F 111"), a recording medium 112, an LCD driver 113, an LCD 114, a microcomputer 115, an operation unit 116, a flash memory 117, an enlargement/reduction unit 118, and an image addition unit 119.

The lens 1010 condenses the optical image of the photographic subject to the image sensor 102. The lens 1010 may be a single focal lens and may be a zoom lens.

The microcomputer 1012 is connected to the I/F 999, the flash memory 1011 and the driver 1013, and reads and writes information stored in the flash memory 1011 and controls the driver 1013. Further, the microcomputer 1012 can communicate with the microcomputer 115 via the I/F 999, and transmits various types of information to the microcomputer 115, and receives from the microcomputer 115 information such as an aperture value.

In response to a direction of the microcomputer 1012, the driver 1013 drives the lens 1010 to change the focal length and the focal position, and drives the diaphragm 1014. The diaphragm 1014 is provided near the lens 1010, and adjusts the amount of light of the photographic subject.

The mechanical shutter 101 is driven in response to a direction of the microcomputer 115, and controls the time to expose the photographic subject to the image sensor 102.

The image sensor 102 is an image sensor with which the color filter of a Bayer arrangement is arranged in front of the photodiode which constitutes each pixel. The Bayer arrangement has a type of line in which R pixels and G (Gr) pixels are arranged alternately in a horizontal direction, and a type of line in which G (Gb) pixels and B pixels are arranged alternately, and the two types of lines are also allocated alternately in a perpendicular direction. This image sensor 102 receives the light condensed with the lens 1010 at the photodiode which constitutes a pixel and performs photoelectric conversion of the light. Thereby, the image sensor 102 outputs the amount of the light as an amount of electric charges to the analog processing unit 103. It should be noted that the image sensor 102 may be a CMOS type or a CCD type.

The analog processing unit 103 performs waveform shaping to the electric signal (analog image signal) read from the image sensor 102, after reducing reset noise, etc., and performs a gain rise so as to obtain the target brightness. The A/D conversion unit 104 converts the analog image signal output from the analog processing unit 103 into a digital image signal (hereinafter referred to as "image data").

The bus 105 is a transfer line for transferring various types of data generated inside the digital camera to each unit in the digital camera. The bus 105 is connected to the A/D conversion unit 104, the SDRAM 106, the image processing unit 107, the AE processing unit 108, the AF processing unit 109, the JPEG processing unit 110, the memory I/F 111, the LCD driver 113, the microcomputer 115, the enlargement/reduction unit 118, and the image addition unit 119.

The image data output from the A/D conversion unit 104 is once stored in the SDRAM 106 via the bus 105. The SDRAM 106 is the memory unit that temporarily stores various types of data such as the image data obtained in the A/D conversion unit 104, and the image data processed in the image processing unit 107, the JPEG processing unit 110, the enlargement/reduction unit 118, and the image addition unit 119.

The image processing unit 107 includes an optical black subtraction unit 1071 (hereinafter referred to as an "OB subtraction unit 1071"), a white balance adjustment unit 1072 (hereinafter referred to as a "WB adjustment unit 1072"), a synchronization processing unit 1073, a gamma/color reproduction processing unit 1074, a color matrix calculation unit 1075, an edge emphasis processing unit 1076, and a noise reduction processing unit 1077 (hereinafter referred to as an "NR processing unit 1077"), and performs various types of image processing to the image data read from the SDRAM 106.

The OB subtraction unit 1071 performs optical black subtraction processing (hereinafter referred to as "OB subtraction processing") to the image data. In the OB subtraction processing, the optical black value (hereinafter referred to as an "OB value") resulting from the dark current of the image sensor 102 and so on is subtracted from the pixel value of each pixel which constitutes the image data.

The WB adjustment unit 1072 adjusts the white balance by multiplying the image data by the white balance gain according to the white balance mode. The white balance mode can be set by the user in accordance with light sources such as "day light", "cloudy", "tungsten", "fluorescent light" and so on.

The synchronization processing unit 1073 performs synchronization processing in which the image data consisting of R, G, and B color information per pixel is generated based on the image data of a Bayer arrangement. The gamma/color reproduction processing unit 1074 performs gamma correction processing and color reproduction processing to change the color of the image.

The color matrix calculation unit 1075 corrects the color of the image data by performing the linear transformation in which the image data is multiplied by the color matrix. The edge emphasis processing unit 1076 performs processing to emphasize the edge of the image data by extracting the edge from the image data, multiply the data of the extracted edge by a predetermined gain, and add it to the image data. The NR processing unit 1077 performs processing to reduce noise by processing in which a filter to reduce high frequency is used, coring processing, etc.

The image processing unit 107 chooses one of the units 1071-1077 provided inside thereof, and performs each processing if needed. The image data after each processing is performed by the image processing unit 107 is stored in the SDRAM 106.

The AE processing unit 108 calculates luminance of the photographic subject from the image data. The data for calculating the luminance of the photographic subject may be an output of the photometry sensor used exclusively. The AF processing unit 109 takes out the signal of the high frequency component from the image data, and acquires a focus evaluation value by the AF (Auto Focus) integration processing.

The enlargement/reduction unit 118 performs processing to reduce or enlarge the size of the image data stored in the SDRAM 106 to the specified size. When reducing the image data, the enlargement/reduction unit 118 performs processing to reduce the number of pixels in the image after reducing high frequency components using a low-pass filter so that aliasing distortions may not arise.

The image addition unit 119 adds the image data subjected to the image processing and the image data of the granular pattern imitated the granular feeling of the silver halide particles, and outputs the image data on which the granular pattern is superposed. The image data on which the granular pattern is superposed is stored in the SDRAM 106. It is noted that the image data subjected to the image processing before the image data of the granular pattern is added includes not only the image data to which reduction processing is not performed in the enlargement/reduction unit 118 but the image data to which reduction processing is performed.

The JPEG processing unit 110 reads the image data from the SDRAM 106, compresses the read image data in accordance with the JPEG compression method, and temporarily stores the compressed JPEG image data in the SDRAM 106.

The microcomputer 115 adds the JPEG header required to configure a JPEG file to the JPEG image data stored in the SDRAM 106 to create a JPEG file, and records the created JPEG file in the recording medium 112 via the memory I/F 111. Although the recording medium 112 is, for example, a recording medium which consists of a memory card which can be detached from and attached on the camera body 100, it is not limited to this.

The LCD driver 113 displays the image onto the LCD 114. The image display includes a "rec view" display in which the image data immediately after the shooting is displayed for only a short period of time, a reproduction display of the JPEG files recorded in the recording medium 112, and a motion picture display such as a "live view" display. When reproducing the JPEG file recorded in the recording medium 112, the JPEG processing unit 110 reads the JPEG file recorded in the recording medium 112, performs the enlargement processing and temporarily stores the enlarged image data into the SDRAM 106. The LCD driver 113 reads the enlarged image data from the SDRAM 106, converts the read image data into a video signal, and then outputs it to the LCD 114 to display the image.

The microcomputer 115 that has a function as a control unit generally controls various types of sequences of the digital camera body 100. The operation unit 116 and the flash memory 117 are connected to the microcomputer 115.

The operation unit 116 is an operation member such as a power button, a release button, and various types of input keys. The microcomputer 115 performs various types of sequences according to the operation of either of the operation members of the operation unit 116 performed by the user. A power button is an operation member for performing ON/OFF directions of the power of the digital camera. When the power button is pushed, the microcomputer 115 turns on or turns off the power of the digital camera. The release button is arranged to include two-step switches, which consists of a first release switch and a second release switch. When the release button is half-pushed to turn the first release switch on, the microcomputer 115 performs the shooting preparation sequences such as AE processing and AF processing. When the release button is fully-pushed to turn the second release switch on, the microcomputer 115 performs the shooting by executing the shooting sequences.

The flash memory 117 stores various types of parameters required for the operation of the digital camera, such as white balance gain in accordance with the white balance mode, a low-pass filter coefficient and so on, the image data of the granular pattern which imitates the granular feeling of the silver halide particles, the manufacturer's number for identifying the digital still camera, etc. Moreover, various types of programs which are executed in the microcomputer 115 are also stored in the flash memory 117. The microcomputer 115 reads from the flash memory 117 parameters required for various types of sequences and executes the processing according to the program stored in the flash memory 117.

Figure 13:
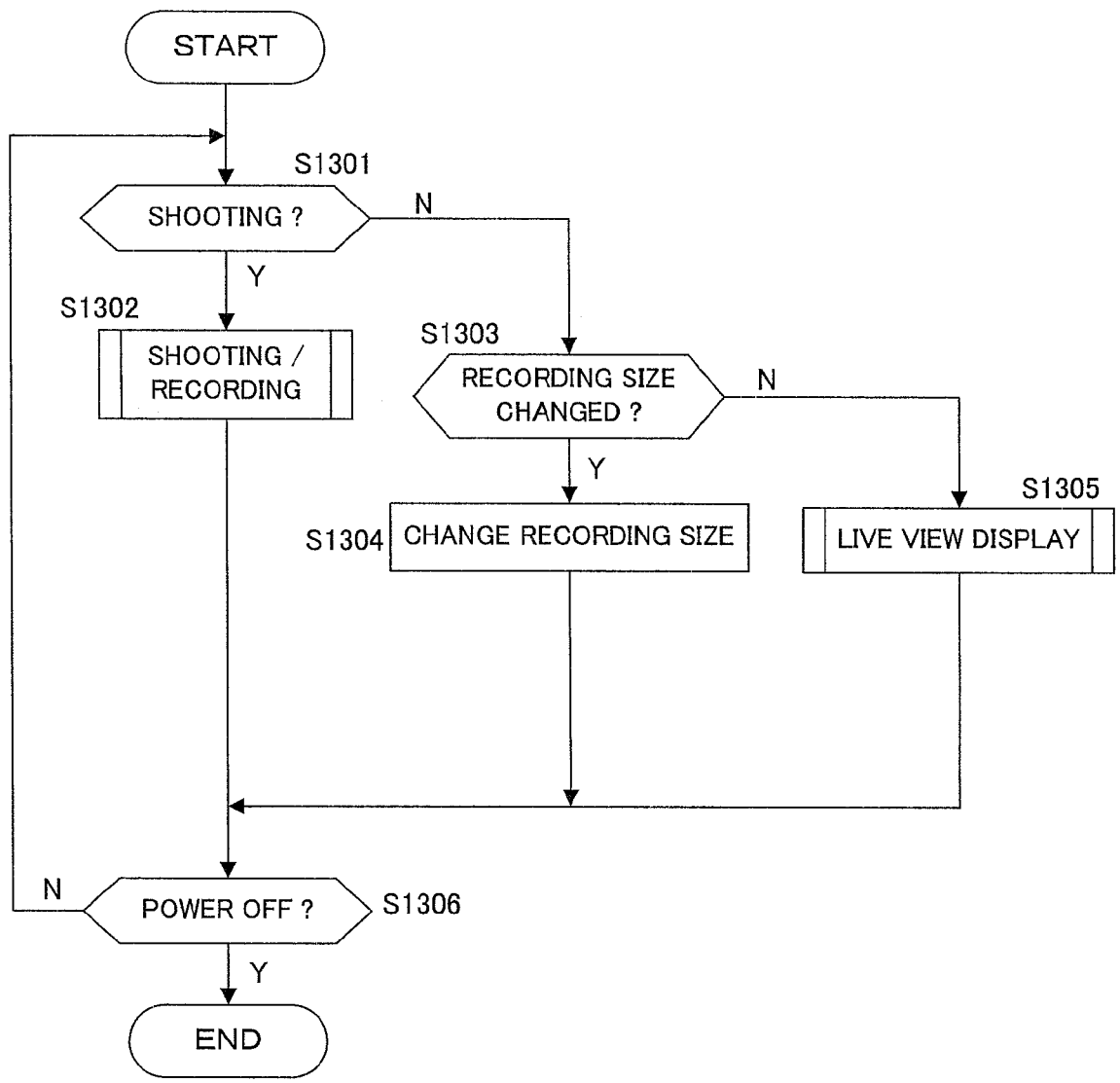
FIG. 13 is a flowchart showing the main processing flow performed in the digital still camera to which the image processing apparatus according to the second embodiment is applied.

FIG. 13 is a flowchart showing the main processing flow performed in the digital still camera to which the image processing apparatus according to the second embodiment is applied. When the power button is pushed by the user to turn on the power of the digital still camera, the microcomputer 115 starts processing of step S1301.

In step S1301, it is determined whether to perform the shooting or not, that is, whether the release button is pushed or not. If it is determined that the release button is pushed, the process proceeds to step S1302 to perform the shooting and recording operation of a still image. The shooting and recording operation of a still image will be described in detail using the flowcharts shown in FIG. 14A and FIG. 14B later.

If it is determined that the release button is not being pushed in step S1301, the process proceeds to step S1303. In step S1303, it is determined whether there are any directions to change the recording size of the image data. A user can change (specify) the recording size of the image data by operating a button of the operation unit 116. For example, the recording size can be chosen from the pixel size of 4032×3024 (full size), 2560×1920, 1280×960, and 640×480. If it is determined that there is a direction to change the recording size by the user, the process proceeds to step S1304.

In step S1304, the change and setting of the recording size are performed according to the directions of the user.

On the other hand, if it is determined that there is no direction to change the recording size in step S1303, the process proceeds to step S1305. A "live view" display is performed in step S1305. The detailed processing of the "live view" display will be described later with reference to the flowchart shown in FIG. 15.

In step S1306, it is determined whether the power of the digital still camera is turned off or not. If it is determined that the power is not turned off, the process returns to step S1301. On the other hand, if it is determined that the power button is pushed by the user and the power has been turned off, the processing of the flowchart ends.

In the flowchart in FIG. 13, it is arranged so that a "live view" display is performed in the case where the release button is not pushed after the power has been turned on and there is no direction to change the recording size of the image data. However, it may be arranged so that the "live view" display may be performed upon the user directing to perform the "live view" display.

Figure 14A:
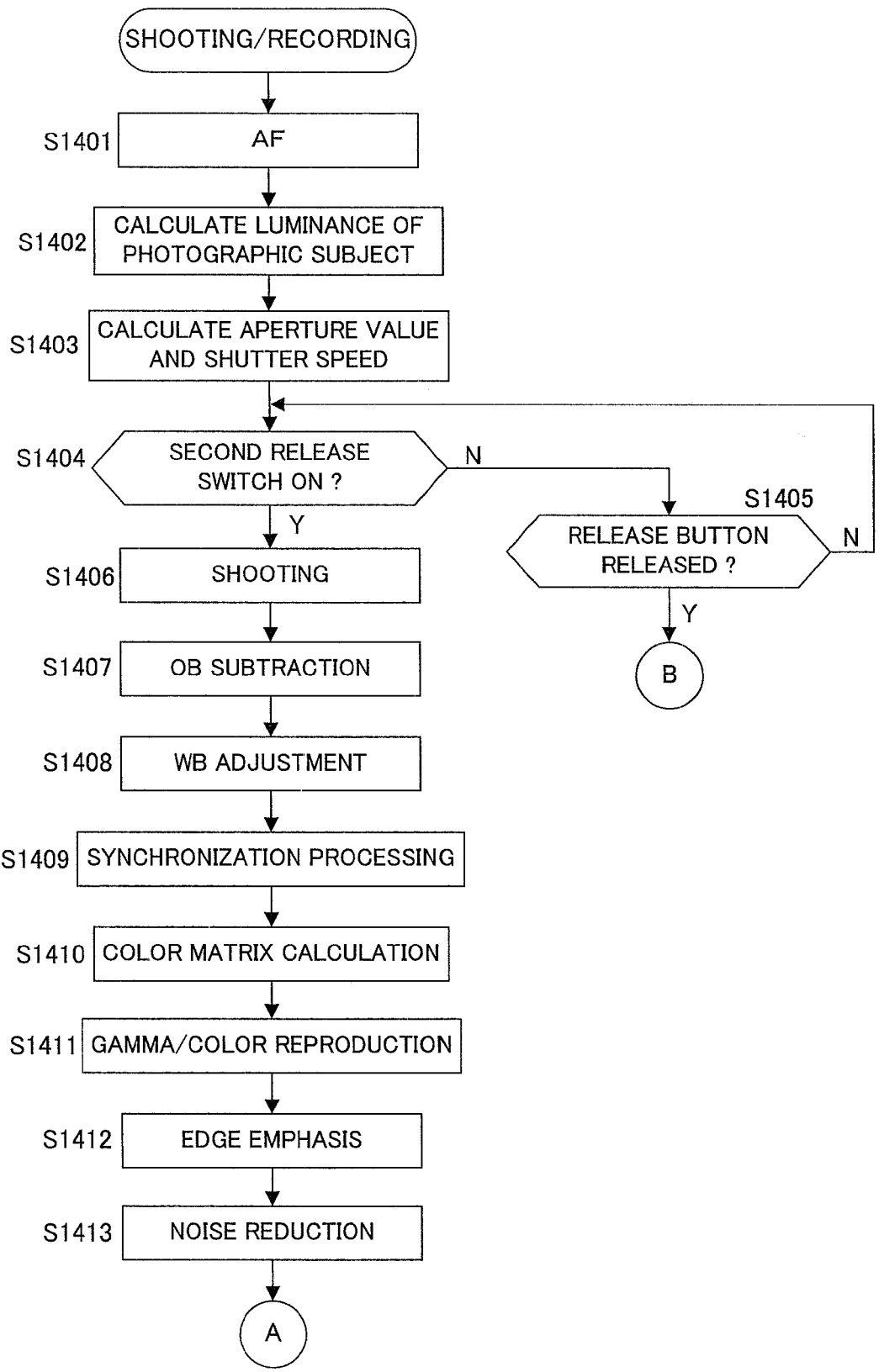
FIG. 14A is a flowchart showing the detailed processing of the shooting and recording operation of a still image performed in step S1302 of the flowchart shown in FIG. 13.
Figure 14B:
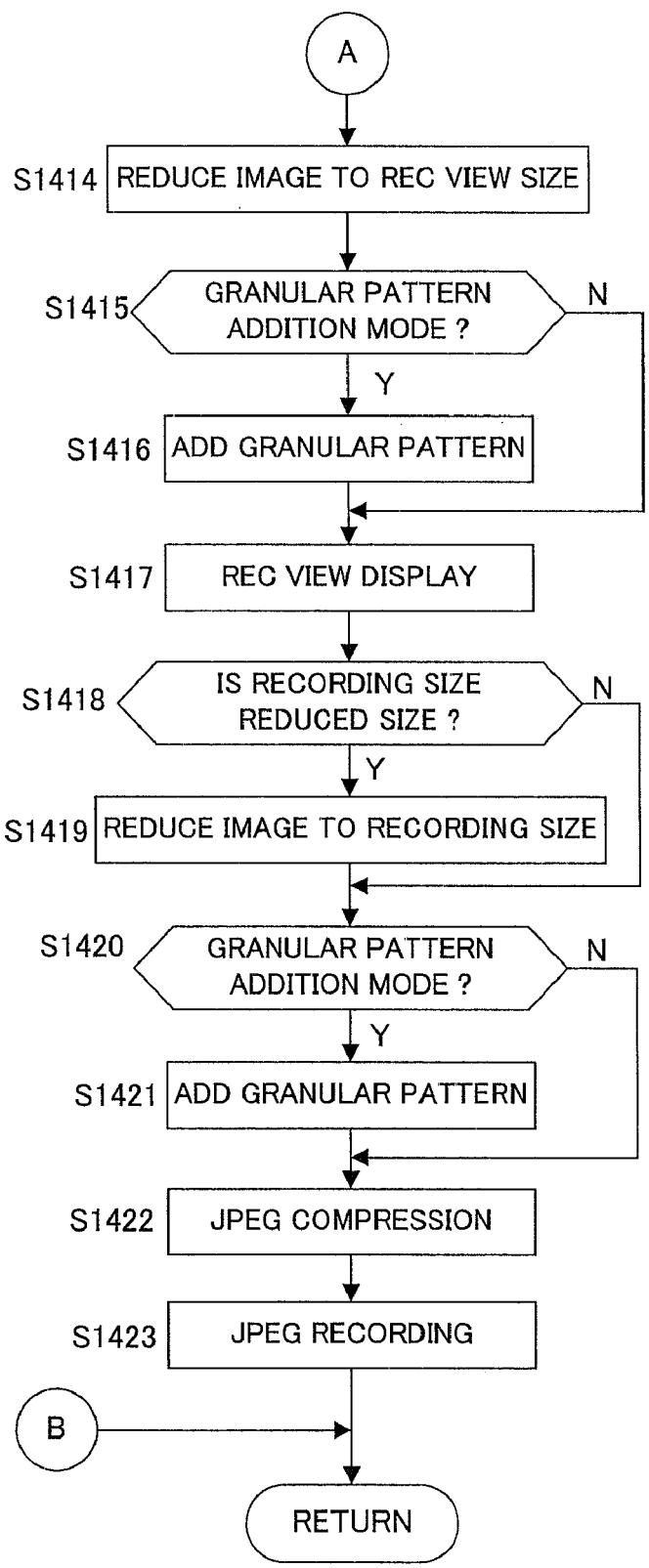
FIG. 14B is a flowchart showing the processing flow following the processing of the flowchart shown in FIG. 14A.

FIG. 14A and FIG. 14B are flowcharts showing the detailed processing of the shooting and recording operation of a still image performed in step S1302 of the flowchart shown in FIG. 13. The processing from step S1401 to step S1403 is carried out upon the first release switch is turned on, and the processing on and after step S1404 is carried out upon the second release switch is turned on.

In step S1401, a focus evaluation value is calculated in the AF processing unit 109. The microcomputer 115 issues instructions to the driver 1013 to drive the lens 1010 based on the focus evaluation value.

In step S1402, the luminance of the photographic subject is calculated in the AE processing unit 108. In step S1403, the aperture and shutter speed are calculated by referring to the aperture value and shutter speed determination table stored in the flash memory 117 based on the luminance of the photographic subject.

In step S1404, it is determined whether the release button is fully-pushed by the user so as to turn the second release switch on. If it is determined that the second release switch is not turned on, the process proceeds to step S1405. In step S1405, it is determined whether the release button is released or not. If it is determined that the release button has been released from the half-pushed state, the shooting/recording operation ends. If it is determined that the release button has not been released, the process returns to step S1404.

On the other hand, if it is determined that the second release switch has been turned on in step S1404, the process proceeds to step S1406. The shooting is performed in step S1406. The shooting can be done as in the conventional methods. The driver 1013 drives the aperture 1014 based on directions of the microcomputer 1012 so that the aperture becomes the set aperture value. Then, based on the calculated shutter speed, the mechanical shutter 101 is controlled for the shooting to obtain the image data (first image data).

In step S1407, the OB subtraction unit 1071 performs OB subtraction processing in which OB value acquired upon the imaging is subtracted from the image data obtained by the shooting.

In step S1408, the WB adjustment unit 1072 performs processing to adjust the white balance by multiplying the image data subjected to the OB subtraction processing by the white balance gain according to the white balance mode. It is noted that the white balance mode can be set for every shooting by the user operating the input keys included in the operation unit 116. The microcomputer 115 sets the white balance mode based on the operation by the user using the operation unit 116. Moreover, if the digital still camera has an automatic white balance function to adjust the white balance automatically, the microcomputer 115 sets the white balance mode automatically according to the light source upon the shooting.

In step S1409, the synchronization processing unit 1073 performs synchronization processing to the image data subjected to the white balance adjustment processing. In step S1410, the color matrix calculation unit 1075 performs color matrix calculation in which the image data subjected to the synchronization processing is multiplied by the color matrix according to the white balance mode.

In step S1411, the gamma/color reproduction processing unit 1074 performs gamma correction processing and color reproduction processing to change the color of the image to the image data subjected to the color matrix calculation.

In step S1412, the edge emphasis processing unit 1076 performs edge emphasis processing to the image data subjected to the gamma correction processing and the color reproduction processing.

In step S1413, the NR processing unit 1077 performs noise reduction processing to the image data subjected to the edge emphasis processing. In the noise reduction processing, coring processing based on coring parameters or processing using a filter to reduce high frequency based on the noise reduction parameter (hereinafter referred to as an "NR parameter") is performed.

After performing step S1413, the process proceeds to step S1414 in FIG. 14B. In step S1414, the enlargement/reduction unit 118 reads the image data subjected to the noise reduction processing (second image data) and reduces the data size of the read image data (full size) into a "rec view" display size. For example, the "rec view" display size is 640×480 pixel size.

In step S1415, it is determined whether it is set to a granular pattern addition mode in which granular pattern image data is added to the image data. The user can set the granular pattern addition mode in advance by operating the operation unit 116. If it is determined that it is not set to the granular pattern addition mode, the process proceeds to step S1417, whereas if it is determined that it is set to the granular pattern addition mode, the process proceeds to step S1416.

In step S1416, the image addition unit 119 adds the granular pattern image data stored in the flash memory 117 to the image data reduced in step S1414. Then, the gamma/color reproduction processing unit 1074 performs gradation conversion processing to emphasize the contrast of the image data subjected to the addition. By this gradation conversion processing, the granular feeling of the highlight and the shadow is reduced, while the granular feeling of the intermediate gradation can be emphasized to express the peculiar granular feeling of silver halide photographs.

In step S1417, the "rec view" display is performed to display the image data onto the LCD 114 for only a short period of time. The image data that, is subjected to the "rec view" display is image data to which the granular pattern is added if the processing of step S1416 is performed, and is image data to which the granular pattern is not added if the processing of step S1416 is not performed.

In step S1418, it is determined whether the set recording size is a reduced size or not. Here, if the set recording size is a full size, it is determined that it is not a reduced size. If a recording size other than the full size is set, it is determined that it is a reduced size. If it is determined that the set recording size is not a reduced size, the process proceeds to step S1420, whereas if it is determined that it is a reduced size, the process proceeds to step S1419.

In step S1419, the enlargement/reduction unit 118 reads the full sized image data stored in the SDRAM 106 after the noise reduction processing is performed in step S1413, and then reduces the data size of the image data to the recording size. The recording size is the data size changed in step S1304 of the flowchart shown in FIG. 13.

In step S1420, it is determined whether it is set to the granular pattern addition mode or not. If it is determined that it is not set to the granular pattern addition mode, the process proceeds to step S1422, whereas if it is determined that it is set to the granular pattern addition mode, the process proceeds to step S1421.

In step S1421, the image addition unit 119 performs processing to add the granular pattern image data stored in the flash memory 117 to the image data (third image data) reduced to the recording size in step S1419. Then, the gamma/color reproduction processing unit 1074 performs gradation conversion processing to emphasize the contrast of the image data subjected to the addition. By this gradation conversion processing, the granular feeling of the highlight and the shadow can be reduced, while the granular feeling of the intermediate gradation can be emphasized to express the peculiar granular feeling of the silver halide photographs.

It is noted that, if the process proceeded to step S1421 after determining that the set recording size is not a reduced size in step S1418, the granular pattern image data is added to the image data subjected to the noise reduction processing in step S1413. In this case, the granular pattern image data to be added to the image data which is not reduced, and the granular pattern image data to be added to the reduced image data are the same.

In step S1422, the JPEG processing unit 110 performs JPEG compression to the image data. The image data to which the JPEG compression is to be performed is the image data to which the granular pattern is added if step S1421 is performed, and it is the image data to which the granular pattern is not added if step S1421 is not performed. In step S1423, shooting information such as the recording mode of the image and the exposure condition is created as file header information, the created file header information is added to the image data subjected to the JPEG compression, and the image data is recorded in the recording medium 112 via the memory I/F 111.

Figure 15:
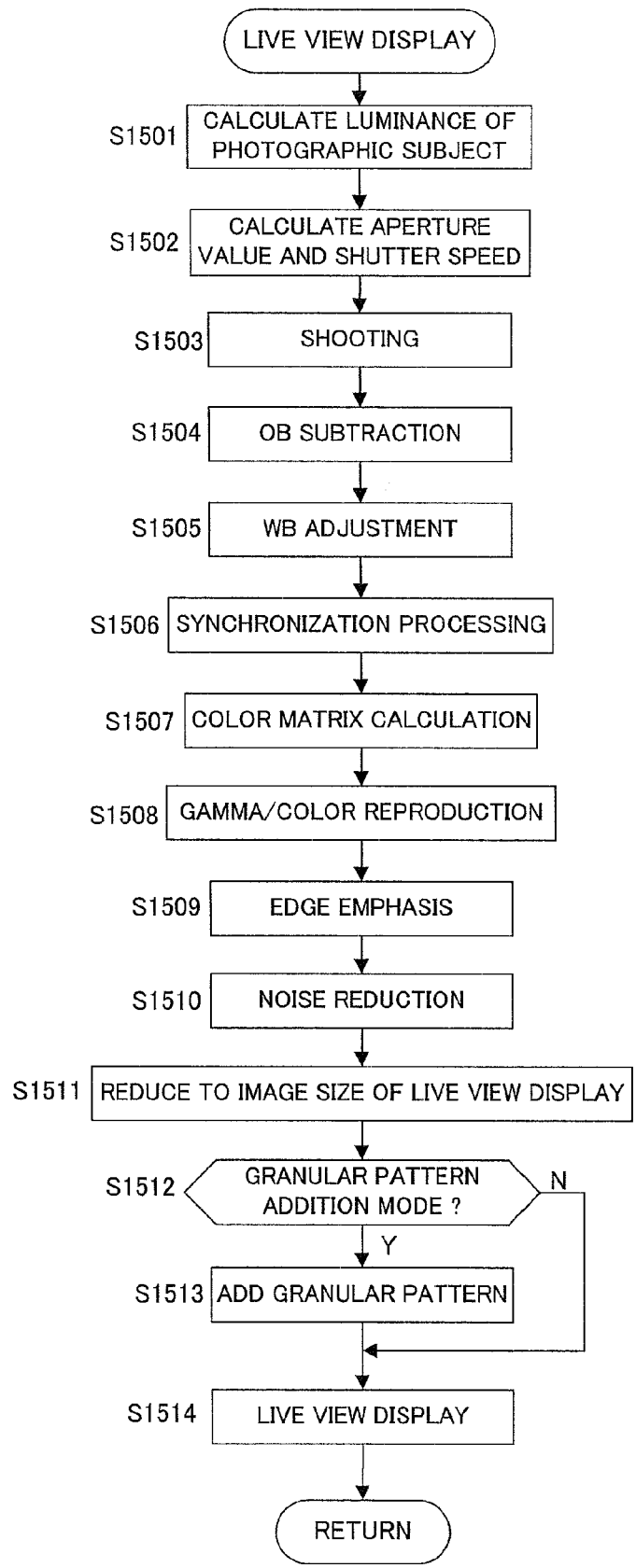
FIG. 15 is a flowchart showing the details of the processing of the "live view" display performed in step S1305 of the flowchart shown in FIG. 13.

FIG. 15 is a flowchart showing the details of the processing of the "live view" display performed in step S1305 of the flowchart shown in FIG. 13.

In step S1501, luminance of the photographic subject is calculated in the AE processing unit 108. In step S1502, based on the luminance of the photographic subject, the aperture value and shutter speed determination table stored in the flash memory 117 are referred to calculate the aperture and the shutter speed.

The shooting is performed in step S1503. This shooting is for a "live view" display, and is done using so-called electronic shutter. Since the shooting for a "live view" display can be done with the same method as conventional method, the detailed description is omitted.

In step S1504, the OB subtraction unit 1071 performs OB subtraction processing in which OB value obtained upon the imaging is subtracted from the image data obtained by the shooting. In step S1505, the WB adjustment unit 1072 performs processing to adjust the white balance by multiplying the image data subjected to the OB subtraction processing by the white balance gain in accordance with the white balance mode.

In step S1506, the synchronization processing unit 1073 performs synchronization processing to the image data subjected to the white balance adjustment processing. In step S1507, the color matrix calculation unit 1075 performs color matrix calculation in which the image data subjected to the synchronization processing is multiplied by the color matrix in accordance with the white balance mode.

In step S1508, the gamma/color reproduction processing unit 1074 performs gamma correction processing and color reproduction processing to change the color of the image to the image data subjected to the color matrix calculation. In step S1509, the edge emphasis processing unit 1076 performs edge emphasis processing to the image data subjected to the gamma correction processing and the color reproduction processing.

In step S1510, the NR processing unit 1077 performs noise reduction processing to the image data subjected to the edge emphasis processing. In the noise reduction processing, coring processing based on the coring parameter, or processing using a filter to reduce high frequency based on the noise reduction parameter (hereinafter referred to as an "NR parameter") are performed.

In step S1511, the enlargement/reduction unit 118 reads the image data stored in the SDRAM 106 after being subjected to the noise reduction processing in step S1510, and reduces the data size of the image data to the image size of the "live view" display. The image size of the "live view" display is, for example, 640×480 pixel size.

In step S1512, it is determined whether it is set to the granular pattern addition mode. If it is determined that it is not set to the granular pattern addition mode, the process proceeds to step S1514, whereas if it is determined that it is set to the granular pattern addition mode, the process proceeds to step S1513.

In step S1513, the image addition unit 119 adds the granular pattern image data stored in the flash memory 117 to the image data reduced in step S1511. Thereafter, the gamma/color reproduction processing unit 1074 performs to the image data subjected to the addition, gradation conversion processing to emphasize the contrast of the image data. The gradation conversion processing makes it possible to achieve the peculiar granular feeling of the silver halide photograph by emphasizing the granular feeling of the intermediate gradation while reducing the granular feeling in the highlight and the shadow region.

In step S1514, the LCD driver 113 displays the image data onto the LCD 114. Here, if the processing of step S1513 has been performed, the image data to which the granular pattern is added is displayed. If the processing of step S1513 has not been performed, the image data to which the granular pattern is not added is displayed. By repeating the processing of step S1501 to step S1514, the "live view" display can be done continuously.

According to the image processing apparatus of the second embodiment which adds a predetermined granular pattern to the image data, a predetermined granular pattern is added to the reduced image data when generating the reduced image data that has small number of pixels. Thus, the reduced image data on which the granular pattern having enough granular feelings is superposed can be obtained. In a case where the reduced image data is generated by reducing the image data to which the granular pattern is added like prior arts, the granular pattern may collapse upon the reduction. However, the granular pattern does not collapse according to the image processing apparatus in accordance with the second embodiment.

Third Embodiment

According to the image processing apparatus of the second embodiment, the reduced image data which maintains the granular feeling is generated by reducing the image data and thereafter, adding a predetermined granular pattern. According to the image processing apparatus of the third embodiment, the reduced image data with the granular pattern added is generated by enlarging the granular pattern with an enlargement ratio corresponding to the reduction rate upon reducing the image, and reducing the image data with the enlarged granular pattern added.

The main processing flow performed in the digital still camera to which the image processing apparatus according to the third embodiment is applied is the same as the processing flow shown in FIG. 13. However, in the third embodiment, since the details of the shooting/recording processing of the still image performed in step S1302 and the "live view" display processing performed in step S1305 differ, the details of these processing will be explained below.

First, the shooting/recording processing of the still image performed in the image processing apparatus according to the third embodiment will be described. In the shooting/recording processing of the still image performed in the image processing apparatus according to the third embodiment, the processing from step S1401 to step S1413 shown in FIG. 14A is the same, and the processing after step S1413 differs compared with the second embodiment. Therefore, the processing after step S1413 will be described hereinafter.

Figure 16:
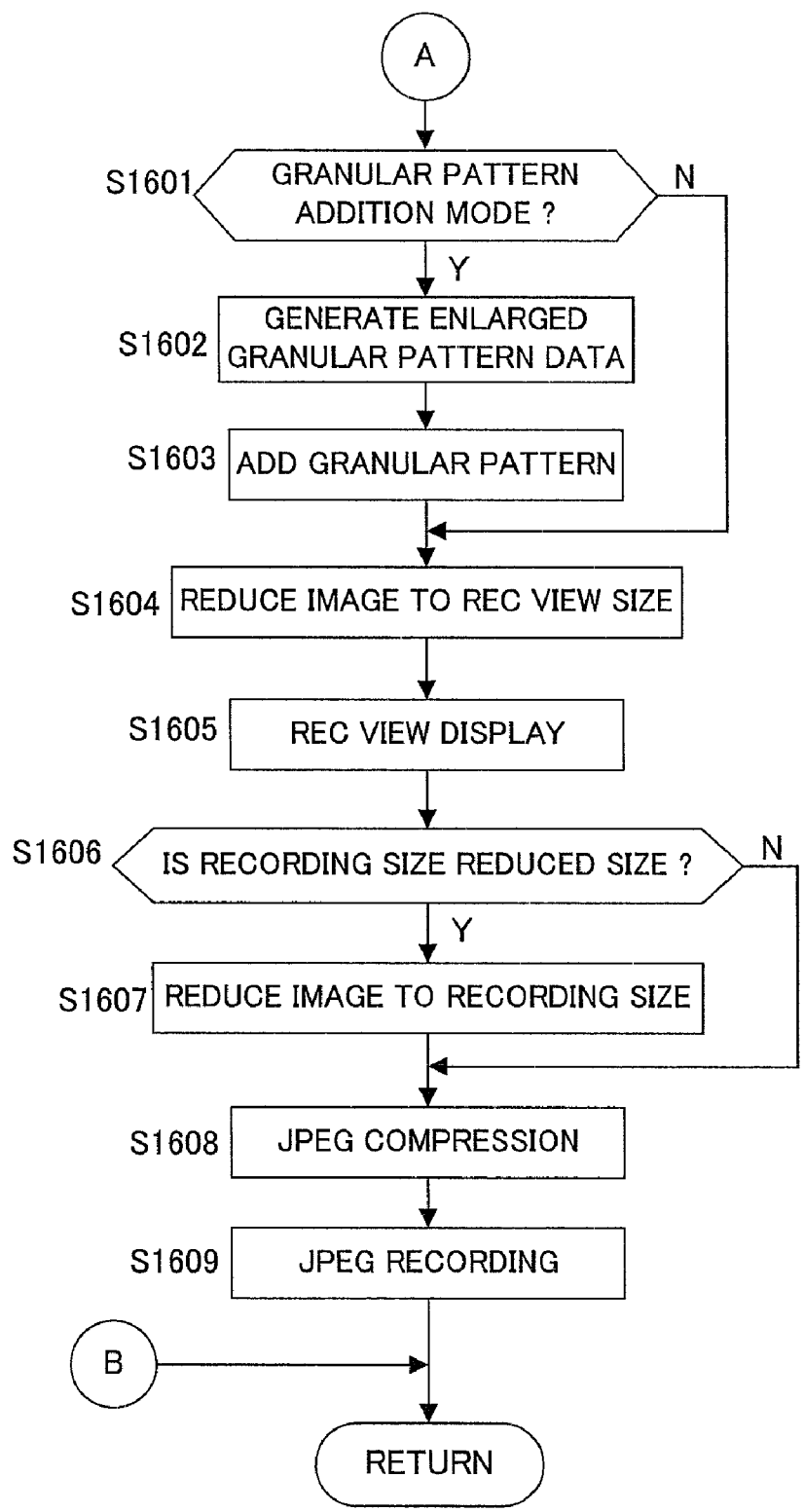
FIG. 16 is a flowchart showing the details of the processing performed after step S1413 in FIG. 14A among the series of processing of the shooting/recording operation of the still image performed in the image processing apparatus according to the third embodiment.

FIG. 16 is a flowchart showing the details of the processing performed after step S1413 in FIG. 14A among the series of processing of the shooting/recording operation of the still image performed in the image processing apparatus according to the third embodiment. In step S1601 which is a subsequent step after step S1413, it is determined whether it is set to a granular pattern addition mode. If it is determined that it is not set to the granular pattern addition mode, the process proceeds to step S1604, and if it is determined that it is set to the granular pattern addition mode, the process proceeds to step S1602.

In step S1602, first, the reciprocal of the reduction ratio upon reducing the full size image data obtained by the shooting to the image data of the recording size is set as an enlargement ratio. Then, the enlarged granular pattern image data is generated by enlarging the granular pattern image data stored in the flash memory 117 with the set enlargement ratio. For example, if the reduction ratio is 1/2, the enlargement ratio is set to 2, and the granular pattern image data stored in the flash memory 117 is enlarged to double size. The processing herein may be done by the microcomputer 115, or by an enlarged granular pattern data generation unit by providing it separately.

In step S1603, after the noise reduction processing is performed by the enlargement/reduction unit 118 in step S1413, the full size image data stored in the SDRAM 106 is read to add it with the enlarged granular pattern image data generated in step S1602. Then, the gamma/color reproduction processing unit 1074 performs gradation conversion processing to the image data subjected to the addition to emphasize the contrast of the image data. By this gradation conversion processing, the granular feeling of the highlight and the shadow region is reduced, as well as the granular feeling of the intermediate gradation can be emphasized to express the peculiar granular feeling of the silver halide photographs.

In step S1604, the enlargement/reduction unit 118 reads the image data with the enlarged granular pattern image data added from the SDRAM 106, and then reduces the data size of the read image data (full size) to the "rec view" display size. However, if the series of processing of steps S1602 and S1603 are not being processed, the image data to which the granular pattern image data is not added is read from the SDRAM 106, and the data size of the read image data is reduced to the "rec view" display size.

In step S1605, the "rec view" display in which the image data reduced in step S1604 is displayed on the LCD 114 for only a very short period of time is performed.

In step S1606, it is determined whether the set recording size is a reduced size or not. If it is determined that the set recording size is not a reduced size, the process proceeds to step S1608, whereas if it is determined that it is a reduced size, the process proceeds to step S1607.

In step S1607, the enlargement/reduction unit 118 reads the full size image data stored in the SDRAM 106 and reduces the data size to the recording size. The image data for reduction is image data added with the enlarged granular pattern image data if the processing of step S1603 is performed, and is image data not added with the enlarged granular pattern image data if the processing of step S1603 is not performed.

In step S1608, the JPEG processing unit 110 performs JPEG compression to the image data. The image data for JPEG compression is the reduced image data if the processing of step S1607 is performed, and is the image data which is not reduced if the processing of step S1607 is not performed. In step S1609, shooting information such as the recording mode of the image and exposure conditions is created as file header information, the created file header information is added to the JPEG compressed image data, and the JPEG compressed image data is recorded in the recording medium 112 through the memory I/F 111.

Now, "live view" display processing performed in the image processing apparatus according to the third embodiment will be described.

Figure 17:
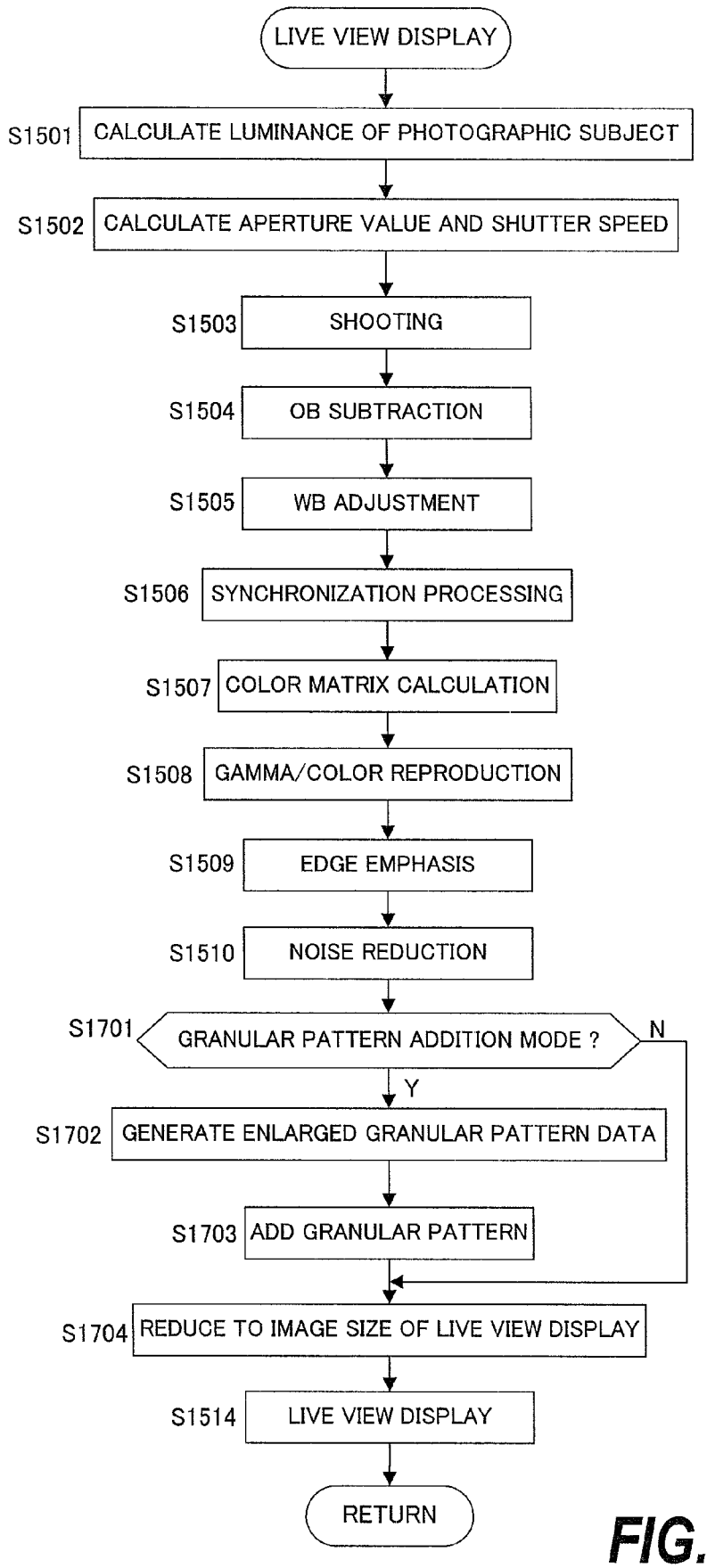
FIG. 17 is a flowchart showing detailed processing of the "live view" display performed in the image processing apparatus according to the third embodiment.

FIG. 17 is a flowchart showing detailed processing of the "live view" display processing performed in the image processing apparatus according to the third embodiment. In FIG. 17, steps in which the same processing is performed as the processing of the flowchart in FIG. 15 are assigned the same numbers and the detailed description will be omitted.

The processing from step S1501 to step S1510 is the same as the processing of the flowchart shown in FIG. 15. In step S1701 which follows step S1510, it is determined whether it is set to the granular pattern addition mode. If it is determined that it is not set to the granular pattern addition mode, the process proceeds to step S1704, and if it is determined that it is set to the granular pattern addition mode, the process proceeds to step S1702.

In step S1702, first, the reciprocal of the reduction ratio upon reducing the full size image data obtained by the shooting to the image data of the recording size is set as an enlargement ratio. Then, the enlarged granular pattern image data is generated by enlarging the granular pattern image data stored in the flash memory 117 with the set enlargement ratio. The processing herein may be done by the microcomputer 115, or by an enlarged granular pattern data generation unit by providing it separately.

In step S1703, the enlargement/reduction unit 118 reads the full size image data stored in the SDRAM 106 after noise reduction processing is performed in step S1510, and adds it to the enlarged granular pattern image data generated in step S1702. Then, the gamma/color reproduction processing unit 1074 performs gradation conversion processing to emphasize the contrast of the image data subjected to the addition. By this gradation conversion processing, the granular feeling of the highlight and the shadow region can be reduced and the granular feeling of the intermediate gradation can be emphasized to express the peculiar granular feeling of silver halide photographs.

In step S1704, the enlargement/reduction unit 118 reads the data added with the enlarged granular pattern image data from the SDRAM 106, reduces the data size of the read image data into the image size for "live view" display. However, if the series of processing of steps S1702 and S1703 has not been processed, the image data to which the enlarged granular pattern image data is not added is read from the SDRAM 106, and the data size of the read image data is reduced to the image size for "live view" display.

In step S1514, the image data reduced in step S1704 is displayed on the LCD 114. By repeating the series of processing from step S1501 to step S1514, the "live view" display can be performed continuously.

According to the image processing apparatus of the third embodiment which generates the reduced image data having smaller number of pixels than the image data with a predetermined reduction ratio, the granular pattern is enlarged with an enlargement ratio that corresponds to the predetermined reduction ratio and the image data added with the enlarged granular pattern is reduced with the predetermined reduction ratio. Thus, the reduced image data on which the granular pattern having sufficient granular feeling is superposed can be obtained.

Moreover, although processing to add the granular pattern image data is performed twice upon the shooting/recording processing of the still image as shown in FIG. 14B in the second embodiment, the processing time period can be reduced in the third embodiment since it only requires once as shown in FIG. 16. It is noted that, in step S1603, the granular pattern image data enlarged with the enlargement ratio which is the reciprocal value of the reduction ratio upon reducing to the recording size image data is added, and thereafter, the "rec view" display is performed. In a case where the "rec view" display size differs from the recording size, the enlarged granular pattern image data does not correspond to the "rec view" display size. However, since the "rec view" display is performed for only a very short time period, it is unlikely to cause problem upon the display.

Although examples in which the image processing apparatus is applied to the digital still camera are described in the above embodiments, a computer may execute a program for realizing the series of processing described in the above embodiments. In this case, the computer includes a CPU, a main storage device such as a RAM, and a computer readable recording medium in which a program for realizing all or a part of the series of processing described in the embodiments is recorded. Here, this program is referred to as an "image processing program". The same processing as the above image processing apparatus is realized by the CPU reading the image processing program stored in the above storage medium, and executing the information modification/calculation processing.

The computer readable recording medium is, for example, a magnetic disc, magnetic optical disc, a CD-ROM, a DVD-ROM or a semiconductor memory. The above image processing program may be transmitted to the computer via communication lines, and the computer may execute the received program.

The present invention should not be limited to the above first to third embodiments, and various types of modification and application are possible without departing from the gist of the present invention. For example, although the granular pattern imitated the granular feeling of the silver halide particles is described as the predetermined granular pattern to be added to the image data, it is not limited to this granular pattern.

Although the gains GRN_Y, GRN_C for determining the intensity of the granular pattern to be added to the image data are calculated according to the ISO sensitivity upon the shooting in the first embodiment of the invention, it may be arbitrary set by the user by operating the operation unit 7. According to this method, the granular pattern of the intensity which the user demands can be added to the image data. Moreover, gains GRN_Y, GRN_C for determining the intensity of the granular pattern may be set according to the degree of noise on the image.

Although the image data is subjected to JPEG compression in the first embodiment of the invention, the compression type of the image data is not limited to JPEG.

In the third embodiment of the invention, even in the case of the "rec view" display, the granular pattern enlarged with the enlargement ratio which is the reciprocal value of the reduction ratio upon reducing to the recording size, is added. However, the "rec view" display may be performed by enlarging the granular pattern with the enlargement ratio which is the reciprocal value of the reduction ratio upon reducing to the "rec view" display size, adding it to the image data, and then, reducing it with the reduction ratio for reducing to the "rec view" size.

The entire contents of Japanese Patent Applications No. 2008-2226060 (filed on Sep. 3, 2008), No. 2008-226074 (filed on Sep. 3, 2008) and No. 2009-95626 (filed on Apr. 10, 2009) are incorporated herein by reference.

What is claimed is:

1. An image processing apparatus comprising:
a synchronization processing unit that generates an image data having a plurality of color components per pixel based on the image data obtained by an imaging apparatus which includes an image sensor arranged with a plurality of color filters;
a first gradation conversion unit that performs first gradation conversion processing to the image data generated by the synchronization processing unit;
a granular pattern addition unit that adds a predetermined granular pattern to the image data subjected to the first gradation conversion processing; and
a second gradation conversion unit that performs second gradation conversion processing different from the first gradation conversion processing to the image data to which the predetermined granular pattern is added.

2. The image processing apparatus according to claim 1, wherein
the second gradation conversion unit performs gradation conversion processing to emphasize contrast of the image data as the second gradation conversion processing.

3. The image processing apparatus according to claim 1, further comprising:
an edge extraction unit that extracts edge for use in edge emphasis processing from image data before the predetermined granular pattern is added.

4. The image processing apparatus according to claim 1, further comprising:
an intensity adjustment unit that adjusts intensity of the predetermined granular pattern to be added to the image data.

5. The image processing apparatus according to claim 4, wherein
the intensity adjustment unit adjusts the intensity of the predetermined granular pattern according to imaging sensitivity upon a shooting by the imaging apparatus.

6. The image processing apparatus according to claim 4, further comprising:
a setting unit that sets the intensity of the predetermined granular pattern to be added to the image data, and wherein
the intensity adjustment unit adjusts the intensity of the predetermined granular pattern based on operation of the setting unit by the user.

7. The image processing apparatus according to claim 1, further comprising:
a noise reduction processing unit that performs predetermined noise reduction processing to the image data obtained by the imaging apparatus including the image sensor arranged with a plurality of color filters, and wherein
the synchronization processing unit generates the image data which has a plurality of color components per pixel based on the image data subjected to the predetermined noise reduction processing.

8. The image processing apparatus according to claim 7, wherein
the noise reduction processing unit performs at least either one of processing to correct a pixel defect of the image sensor and processing to reduce random noise generated upon a shooting by the imaging apparatus as the predetermined noise reduction processing.

9. The image processing apparatus according to claim 7, further comprising:
a control unit that controls degree of the noise reduction processing and intensity of the predetermined granular pattern to be added to the image data generated by the synchronization processing unit in accordance with imaging sensitivity upon a shooting by the imaging apparatus.

10. The image processing apparatus according to claim 8, further comprising:
a control unit that controls degree of the noise reduction processing and intensity of the predetermined granular pattern to be added to the image data generated by the synchronization processing unit in accordance with imaging sensitivity upon a shooting by the imaging apparatus.

11. The image processing apparatus according to claim 9, wherein
the control unit controls the degree of the noise reduction processing and the intensity of the predetermined granular pattern so as to equalize granular feeling of the predetermined granular pattern added to the image data even if the imaging sensitivity upon the shooting by the imaging apparatus differs.

12. The image processing apparatus according to claim 10, wherein
the control unit controls the degree of the noise reduction processing and the intensity of the predetermined granular pattern so as to equalize granular feeling of the predetermined granular pattern added to the image data even if the imaging sensitivity upon the shooting by the imaging apparatus differs.

13. An image processing apparatus, comprising:
a granular pattern addition unit that adds a predetermined granular pattern to an image data subjected to predetermined image processing including at least first gradation conversion processing; and
a second gradation conversion unit that performs second gradation conversion processing different from the first gradation conversion processing to the image data to which the predetermined granular pattern is added.

14. The image processing apparatus according to claim 13, wherein
the second gradation conversion unit performs gradation conversion processing to emphasize contrast of the image data as the second gradation conversion processing.

15. An image processing method comprising:
a first step of generating an image data having a plurality of color components per pixel based on the image data obtained by an imaging apparatus which includes an image sensor arranged with a plurality of color filters;
a second step of performing first gradation conversion processing to the image data having a plurality of color components per pixel;
a third step of adding a predetermined granular pattern to the image data subjected to the first gradation conversion processing; and
a fourth step of performing second gradation conversion processing different from the first gradation conversion processing to the image data to which the predetermined granular pattern is added.

16. The image processing method according to claim 15, further comprising:
a step of performing predetermined noise reduction processing to the image data obtained by the imaging apparatus including the image sensor arranged with a plurality of color filters, and wherein
the image data which has a plurality of color components per pixel is generated based on the image data subjected to the predetermined noise reduction processing in the first step.

17. A non-transitory computer readable recording medium storing an image processing program that is executed by a computer, the image processing program comprising:
a first step of generating an image data having a plurality of color components per pixel based on the image data obtained by an imaging apparatus which includes an image sensor arranged with a plurality of color filters;
a second step of performing first gradation conversion processing to the image data having a plurality of color components per pixel;
a third step of adding a predetermined granular pattern to the image data subjected to the first gradation conversion processing; and
a fourth step of performing second gradation conversion processing different from the first gradation conversion processing to the image data to which the predetermined granular patter is added.

18. The non-transitory computer readable recording medium according to claim 17, the image processing program further comprising:
a step of performing predetermined noise reduction processing to the image data obtained by the imaging apparatus including the image sensor arranged with a plurality of color filters, and wherein
the image data which has a plurality of color components per pixel is generated based on the image data subjected to the predetermined noise reduction processing in the first step.

\* \* \* \* \*